(12) United States Patent
Boyer et al.

(10) Patent No.: US 9,003,451 B2
(45) Date of Patent: Apr. 7, 2015

(54) INTERNET TELEVISION PROGRAM GUIDE SYSTEM

(75) Inventors: Franklin E. Boyer, Cleveland, OK (US); Timothy B. Demers, Tulsa, OK (US); Donald W. Allison, Tulsa, OK (US); Mark A. Regouby, Tulsa, OK (US); Steven C. Williamson, Broken Arrow, OK (US); Joanna L. Hensley, Tulsa, OK (US); W. Benjamin Herrington, Tulsa, OK (US); Paul N. Reddy, Sand Springs, OK (US)

(73) Assignee: Rovi Guides, Inc., Santa Clara, CA (US)

( * ) Notice: Subject to any disclaimer, the term of this patent is extended or adjusted under 35 U.S.C. 154(b) by 0 days.

(21) Appl. No.: 12/771,786

(22) Filed: Apr. 30, 2010

(65) Prior Publication Data

US 2010/0211975 A1    Aug. 19, 2010

Related U.S. Application Data

(63) Continuation of application No. 11/894,621, filed on Aug. 20, 2007, which is a continuation of application No. 11/486,948, filed on Jul. 13, 2006, now abandoned, which is a continuation of application No.

(Continued)

(51) Int. Cl.
*H04N 5/445* (2011.01)
*H04N 7/16* (2011.01)
(Continued)

(52) U.S. Cl.
CPC ........... *H04N 5/44543* (2013.01); *H04N 5/445* (2013.01); *H04N 7/163* (2013.01);
(Continued)

(58) Field of Classification Search
USPC ............ 725/58, 37, 39, 40, 47, 51, 109, 110, 725/112; 348/E5.105, E7.036, E5.002
See application file for complete search history.

(56) References Cited

U.S. PATENT DOCUMENTS

| 4,024,401 A | 5/1977 | Bernstein et al. |
| 4,081,753 A | 3/1978 | Miller |

(Continued)

FOREIGN PATENT DOCUMENTS

| CA | 2345161 A1 | 6/1994 |
| CN | 1567986 | 1/2005 |

(Continued)

OTHER PUBLICATIONS

"Dial M for Movie," Funkschau Nov. 1994, Perspektiven, Video on Demand, pp. 78-79. (English language translation attached.).

(Continued)

*Primary Examiner* — Jun Fei Zhong
(74) *Attorney, Agent, or Firm* — Ropes & Gray LLP

(57) ABSTRACT

An Internet television program guide system is provided that allows a user at a multimedia system to access information related to television programs over an Internet communications link. The user can view television program guide listings and related video stills and video clips. The user can perform database searches on the program guide listings (e.g., to search for a particular type of television program). The user can set a reminder message for a television program that is transmitted prior to the transmission time of the program. If desired, the user can select an option that directs the multimedia system to tune directly to a television channel for a selected program or to a related television program guide or movie guide service on a television channel. The user can order pay-per-view events using the system.

33 Claims, 34 Drawing Sheets

Related U.S. Application Data

11/115,099, filed on Apr. 26, 2005, which is a continuation of application No. 10/735,093, filed on Dec. 12, 2003, now abandoned, which is a continuation of application No. 10/287,640, filed on Nov. 1, 2002, now abandoned, which is a continuation of application No. 09/560,207, filed on Apr. 27, 2000, now abandoned, which is a continuation of application No. 08/938,028, filed on Sep. 18, 1997, now abandoned.

(60) Provisional application No. 60/032,539, filed on Dec. 10, 1996.

(51) Int. Cl.

| | |
|---|---|
| *H04N 7/173* | (2011.01) |
| *H04N 21/235* | (2011.01) |
| *H04N 21/262* | (2011.01) |
| *H04N 21/435* | (2011.01) |
| *H04N 21/438* | (2011.01) |
| *H04N 21/462* | (2011.01) |
| *H04N 21/472* | (2011.01) |
| *H04N 21/4725* | (2011.01) |
| *H04N 21/4782* | (2011.01) |
| *H04N 21/482* | (2011.01) |
| *H04N 21/61* | (2011.01) |
| *H04N 21/643* | (2011.01) |
| *H04N 21/81* | (2011.01) |
| *H04N 21/84* | (2011.01) |
| *H04N 21/8549* | (2011.01) |
| *H04N 21/858* | (2011.01) |
| *H04N 5/45* | (2011.01) |
| *H04N 21/431* | (2011.01) |
| *H04N 21/47* | (2011.01) |
| *H04N 21/478* | (2011.01) |

(52) U.S. Cl.
CPC ......... *H04N7/17318* (2013.01); *H04N 21/235* (2013.01); *H04N 21/26283* (2013.01); *H04N 21/435* (2013.01); *H04N 21/4381* (2013.01); *H04N 21/4622* (2013.01); *H04N 21/47211* (2013.01); *H04N 21/4725* (2013.01); *H04N 21/4782* (2013.01); *H04N 21/482* (2013.01); *H04N 21/4821* (2013.01); *H04N 21/4828* (2013.01); *H04N 21/6125* (2013.01); *H04N 21/6175* (2013.01); *H04N 21/64322* (2013.01); *H04N 21/8153* (2013.01); *H04N 21/84* (2013.01); *H04N 21/8549* (2013.01); *H04N 21/8586* (2013.01); *H04N 5/45* (2013.01); *H04N 21/4316* (2013.01); *H04N 21/47* (2013.01); *H04N 21/478* (2013.01)

(56) References Cited

U.S. PATENT DOCUMENTS

| | | |
|---|---|---|
| 4,170,782 A | 10/1979 | Miller |
| 4,271,532 A | 6/1981 | Wine |
| 4,280,148 A | 7/1981 | Saxena |
| 4,300,040 A | 11/1981 | Gould et al. |
| 4,367,559 A | 1/1983 | Tults |
| 4,375,651 A | 3/1983 | Templin et al. |
| 4,381,522 A | 4/1983 | Lambert |
| 4,385,210 A | 5/1983 | Marquiss |
| 4,390,901 A | 6/1983 | Keiser et al. |
| 4,425,579 A | 1/1984 | Merrell |
| 4,429,385 A | 1/1984 | Cichelli et al. |
| 4,495,654 A | 1/1985 | Deiss |
| 4,527,194 A | 7/1985 | Sirazi |
| 4,605,973 A | 8/1986 | Von Kohorn |
| 4,625,080 A | 11/1986 | Scott |
| 4,641,205 A | 2/1987 | Beyers, Jr. |
| 4,645,873 A | 2/1987 | Chomet |
| 4,677,501 A | 6/1987 | Saltzman et al. |
| 4,689,022 A | 8/1987 | Peers et al. |
| 4,691,351 A | 9/1987 | Hayashi et al. |
| 4,694,490 A | 9/1987 | Harvey et al. |
| 4,706,121 A | 11/1987 | Young |
| 4,751,578 A | 6/1988 | Reiter et al. |
| 4,754,326 A | 6/1988 | Kram et al. |
| 4,761,684 A | 8/1988 | Clark et al. |
| 4,787,063 A | 11/1988 | Muguet et al. |
| 4,882,732 A | 11/1989 | Kaminaga et al. |
| 4,908,707 A | 3/1990 | Kinghorn |
| 4,908,713 A | 3/1990 | Levine |
| 4,959,719 A | 9/1990 | Strubbe et al. |
| 4,963,994 A | 10/1990 | Levine |
| 4,965,825 A | 10/1990 | Harvey et al. |
| 4,977,455 A | 12/1990 | Young |
| 5,016,273 A | 5/1991 | Hoff |
| 5,027,400 A | 6/1991 | Baji et al. |
| 5,036,314 A | 7/1991 | Barillari et al. |
| 5,038,211 A | 8/1991 | Hallenbeck |
| 5,046,092 A | 9/1991 | Walker et al. |
| 5,047,867 A | 9/1991 | Strubbe et al. |
| 5,075,771 A | 12/1991 | Hashimoto |
| 5,089,885 A | 2/1992 | Clark |
| 5,090,049 A | 2/1992 | Chen |
| 5,113,259 A | 5/1992 | Romesburg et al. |
| 5,126,851 A | 6/1992 | Yoshimura et al. |
| 5,132,992 A | 7/1992 | Yurt et al. |
| 5,151,789 A | 9/1992 | Young |
| 5,155,591 A | 10/1992 | Wachob |
| 5,170,388 A | 12/1992 | Endoh |
| 5,179,439 A | 1/1993 | Hashimoto |
| 5,187,589 A | 2/1993 | Kono et al. |
| 5,189,630 A | 2/1993 | Barstow et al. |
| 5,191,423 A | 3/1993 | Yoshida |
| 5,195,134 A | 3/1993 | Inoue |
| 5,210,611 A | 5/1993 | Yee et al. |
| 5,223,924 A | 6/1993 | Strubbe |
| 5,231,494 A | 7/1993 | Wachob |
| 5,233,423 A | 8/1993 | Jernigan et al. |
| 5,253,066 A | 10/1993 | Vogel |
| 5,262,860 A | 11/1993 | Fitzpatrick et al. |
| 5,283,819 A | 2/1994 | Glick et al. |
| 5,293,357 A | 3/1994 | Hallenbeck |
| 5,296,931 A | 3/1994 | Na |
| 5,297,204 A | 3/1994 | Levine |
| 5,317,403 A | 5/1994 | Keenan |
| 5,323,240 A | 6/1994 | Amano et al. |
| 5,325,423 A | 6/1994 | Lewis |
| 5,335,277 A | 8/1994 | Harvey et al. |
| 5,347,632 A | 9/1994 | Filepp et al. |
| 5,353,121 A | 10/1994 | Young et al. |
| 5,359,367 A | 10/1994 | Stockill |
| 5,371,551 A | 12/1994 | Logan et al. |
| 5,382,983 A | 1/1995 | Kwoh et al. |
| 5,396,546 A | 3/1995 | Remillard |
| 5,398,138 A | 3/1995 | Tomita |
| 5,410,326 A | 4/1995 | Goldstein |
| 5,410,344 A | 4/1995 | Graves et al. |
| 5,410,367 A | 4/1995 | Zahavi et al. |
| 5,412,720 A | 5/1995 | Hoarty |
| 5,414,756 A | 5/1995 | Levine |
| 5,432,561 A | 7/1995 | Strubbe |
| 5,438,355 A | 8/1995 | Palmer |
| 5,444,499 A | 8/1995 | Saitoh et al. |
| 5,446,919 A | 8/1995 | Wilkins |
| 5,455,570 A | 10/1995 | Cook et al. |
| 5,457,478 A | 10/1995 | Frank |
| 5,465,113 A | 11/1995 | Gilboy |
| 5,465,385 A | 11/1995 | Ohga et al. |
| 5,469,206 A | 11/1995 | Strubbe et al. |
| 5,477,262 A | 12/1995 | Banker et al. |
| 5,479,266 A | 12/1995 | Young et al. |
| 5,479,268 A | 12/1995 | Young et al. |
| 5,481,296 A | 1/1996 | Cragun et al. |
| 5,483,278 A | 1/1996 | Strubbe et al. |

(56) References Cited

U.S. PATENT DOCUMENTS

| | | |
|---|---|---|
| 5,488,409 A | 1/1996 | Yuen et al. |
| 5,502,504 A | 3/1996 | Marshall et al. |
| 5,515,106 A | 5/1996 | Chaney et al. |
| 5,515,511 A | 5/1996 | Nguyen et al. |
| 5,517,254 A | 5/1996 | Monta et al. |
| 5,517,256 A | 5/1996 | Hashimoto |
| 5,523,796 A | 6/1996 | Marshall et al. |
| 5,524,195 A | 6/1996 | Clanton, III et al. |
| 5,526,034 A | 6/1996 | Hoarty et al. |
| 5,528,304 A | 6/1996 | Cherrick et al. |
| 5,534,911 A | 7/1996 | Levitan |
| 5,543,933 A | 8/1996 | Kang et al. |
| 5,544,321 A | 8/1996 | Theimer et al. |
| 5,550,576 A | 8/1996 | Klosterman |
| 5,550,578 A | 8/1996 | Hoarty et al. |
| 5,550,863 A | 8/1996 | Yurt et al. |
| 5,553,221 A | 9/1996 | Reimer et al. |
| 5,559,548 A | 9/1996 | Davis et al. |
| 5,559,549 A | 9/1996 | Hendricks et al. |
| 5,559,550 A | 9/1996 | Mankovitz |
| 5,561,709 A | 10/1996 | Remillard |
| 5,563,665 A | 10/1996 | Chang |
| 5,570,295 A | 10/1996 | Isenberg et al. |
| 5,572,442 A | 11/1996 | Schulhof et al. |
| 5,576,755 A | 11/1996 | Davis et al. |
| 5,579,239 A | 11/1996 | Freeman et al. |
| 5,583,560 A | 12/1996 | Florin et al. |
| 5,585,838 A | 12/1996 | Lawler et al. |
| 5,585,865 A | 12/1996 | Amano et al. |
| 5,585,866 A | 12/1996 | Miller et al. |
| 5,589,892 A | 12/1996 | Knee et al. |
| 5,592,551 A | 1/1997 | Lett et al. |
| 5,594,490 A | 1/1997 | Dawson et al. |
| 5,594,509 A | 1/1997 | Florin et al. |
| 5,594,661 A | 1/1997 | Bruner et al. |
| 5,596,373 A | 1/1997 | White et al. |
| 5,596,705 A | 1/1997 | Reimer et al. |
| 5,600,364 A | 2/1997 | Hendricks et al. |
| 5,606,374 A | 2/1997 | Bertram |
| 5,616,876 A | 4/1997 | Cluts |
| 5,617,526 A | 4/1997 | Oran et al. |
| 5,617,565 A | 4/1997 | Augenbraun et al. |
| 5,619,249 A | 4/1997 | Billock et al. |
| 5,621,456 A | 4/1997 | Florin et al. |
| 5,623,613 A | 4/1997 | Rowe et al. |
| 5,625,693 A | 4/1997 | Rohatgi et al. |
| 5,629,733 A | 5/1997 | Youman et al. |
| 5,630,119 A | 5/1997 | Aristides et al. |
| 5,631,995 A | 5/1997 | Weissensteiner et al. |
| 5,635,978 A | 6/1997 | Alten et al. |
| 5,635,979 A | 6/1997 | Kostreski et al. |
| 5,635,989 A | 6/1997 | Rothmuller |
| 5,640,484 A | 6/1997 | Mankovitz |
| 5,654,748 A | 8/1997 | Matthews, III |
| 5,657,072 A | 8/1997 | Aristides et al. |
| 5,659,742 A | 8/1997 | Beattie et al. |
| 5,663,757 A | 9/1997 | Morales |
| 5,666,293 A | 9/1997 | Metz et al. |
| 5,666,645 A | 9/1997 | Thomas et al. |
| 5,671,411 A | 9/1997 | Watts et al. |
| 5,675,390 A | 10/1997 | Schindler et al. |
| 5,677,708 A | 10/1997 | Matthews, III et al. |
| 5,677,981 A | 10/1997 | Kato et al. |
| 5,682,206 A | 10/1997 | Wehmeyer et al. |
| 5,682,525 A | 10/1997 | Bouve et al. |
| 5,684,525 A | 11/1997 | Klosterman |
| 5,686,954 A | 11/1997 | Yoshinobu et al. |
| 5,689,663 A | 11/1997 | Williams |
| 5,691,476 A | 11/1997 | Madaras |
| 5,692,214 A | 11/1997 | Levine |
| 5,694,163 A | 12/1997 | Harrison |
| 5,694,176 A | 12/1997 | Bruette et al. |
| 5,696,905 A | 12/1997 | Reimer et al. |
| 5,699,052 A | 12/1997 | Miyahara |
| 5,699,107 A * | 12/1997 | Lawler et al. ............ 725/58 |
| 5,699,528 A | 12/1997 | Hogan |
| 5,708,767 A | 1/1998 | Yeo et al. |
| 5,708,780 A | 1/1998 | Levergood et al. |
| 5,710,601 A | 1/1998 | Marshall et al. |
| 5,710,884 A | 1/1998 | Dedrick |
| 5,717,923 A | 2/1998 | Dedrick |
| 5,722,041 A | 2/1998 | Freadman |
| 5,724,103 A | 3/1998 | Batchelor |
| 5,724,567 A | 3/1998 | Rose et al. |
| 5,726,702 A | 3/1998 | Hamaguchi et al. |
| 5,731,844 A | 3/1998 | Rauch et al. |
| 5,734,853 A | 3/1998 | Hendricks et al. |
| 5,734,893 A | 3/1998 | Li et al. |
| 5,740,549 A | 4/1998 | Reilly et al. |
| 5,742,816 A | 4/1998 | Barr et al. |
| 5,745,710 A | 4/1998 | Clanton, III et al. |
| 5,748,191 A | 5/1998 | Rozak et al. |
| 5,748,716 A | 5/1998 | Levine |
| 5,749,081 A | 5/1998 | Whiteis |
| 5,751,282 A | 5/1998 | Girard et al. |
| 5,752,160 A | 5/1998 | Dunn |
| 5,754,939 A | 5/1998 | Herz et al. |
| 5,758,257 A | 5/1998 | Herz et al. |
| 5,758,259 A | 5/1998 | Lawler |
| 5,760,821 A | 6/1998 | Ellis et al. |
| 5,761,372 A | 6/1998 | Yoshinobu et al. |
| 5,761,606 A | 6/1998 | Wolzien |
| 5,768,528 A | 6/1998 | Stumm |
| 5,774,357 A | 6/1998 | Hoffberg et al. |
| 5,774,664 A | 6/1998 | Hidary et al. |
| 5,778,181 A | 7/1998 | Hidary et al. |
| 5,781,246 A | 7/1998 | Alten et al. |
| 5,781,734 A | 7/1998 | Ohno et al. |
| 5,787,259 A | 7/1998 | Haroun et al. |
| 5,788,507 A | 8/1998 | Redford et al. |
| 5,790,201 A | 8/1998 | Antos |
| 5,790,202 A | 8/1998 | Kummer et al. |
| 5,790,753 A | 8/1998 | Krishnamoorthy et al. |
| 5,793,964 A | 8/1998 | Rogers et al. |
| 5,793,972 A | 8/1998 | Shane |
| 5,798,785 A | 8/1998 | Hendricks et al. |
| 5,801,747 A | 9/1998 | Bedard |
| 5,805,763 A | 9/1998 | Lawler et al. |
| 5,805,806 A | 9/1998 | McArthur |
| 5,809,214 A | 9/1998 | Nureki et al. |
| 5,809,242 A | 9/1998 | Shaw et al. |
| 5,809,471 A | 9/1998 | Brodsky |
| 5,812,124 A | 9/1998 | Eick et al. |
| 5,812,931 A | 9/1998 | Yuen |
| 5,815,145 A | 9/1998 | Matthews, III |
| 5,818,441 A | 10/1998 | Throckmorton et al. |
| 5,818,511 A | 10/1998 | Farry et al. |
| 5,818,935 A | 10/1998 | Maa |
| 5,819,156 A | 10/1998 | Belmont |
| 5,819,285 A | 10/1998 | Damico et al. |
| 5,822,123 A | 10/1998 | Davis et al. |
| 5,828,419 A | 10/1998 | Bruette et al. |
| 5,828,420 A | 10/1998 | Marshall et al. |
| 5,828,839 A | 10/1998 | Moncreiff |
| 5,828,945 A | 10/1998 | Klosterman |
| 5,832,223 A | 11/1998 | Hara et al. |
| 5,833,468 A | 11/1998 | Guy et al. |
| 5,835,717 A | 11/1998 | Karlton et al. |
| 5,838,383 A | 11/1998 | Chimoto et al. |
| 5,844,552 A | 12/1998 | Gaughan et al. |
| 5,844,620 A | 12/1998 | Coleman et al. |
| 5,848,396 A | 12/1998 | Gerace |
| 5,850,218 A | 12/1998 | LaJoie et al. |
| 5,852,437 A | 12/1998 | Wugofski et al. |
| 5,861,881 A | 1/1999 | Freeman et al. |
| 5,861,906 A | 1/1999 | Dunn et al. |
| 5,862,292 A | 1/1999 | Kubota et al. |
| 5,867,226 A | 2/1999 | Wehmeyer et al. |
| 5,867,233 A | 2/1999 | Tanaka et al. |
| 5,870,754 A | 2/1999 | Dimitrova et al. |
| 5,873,660 A | 2/1999 | Walsh et al. |
| 5,875,108 A | 2/1999 | Hoffberg et al. |
| 5,877,906 A | 3/1999 | Nagasawa et al. |
| 5,880,720 A | 3/1999 | Iwafune et al. |

(56) References Cited

U.S. PATENT DOCUMENTS

| | | | |
|---|---|---|---|
| 5,880,768 A | 3/1999 | Lemmons et al. | |
| 5,886,732 A | 3/1999 | Humpleman | |
| 5,889,950 A | 3/1999 | Kuzma | |
| 5,890,138 A | 3/1999 | Godin et al. | |
| 5,892,536 A | 4/1999 | Logan et al. | |
| 5,892,767 A | 4/1999 | Bell et al. | |
| 5,903,314 A | 5/1999 | Niijima et al. | |
| 5,903,545 A | 5/1999 | Sabourin et al. | |
| 5,903,816 A | 5/1999 | Broadwin et al. | |
| 5,905,865 A | 5/1999 | Palmer et al. | |
| 5,907,322 A | 5/1999 | Kelly et al. | |
| 5,907,323 A | 5/1999 | Lawler et al. | |
| 5,914,712 A | 6/1999 | Sartain et al. | |
| 5,914,746 A | 6/1999 | Matthews, III et al. | |
| 5,915,026 A | 6/1999 | Mankovitz | |
| 5,915,250 A | 6/1999 | Jain et al. | |
| 5,923,848 A * | 7/1999 | Goodhand et al. | 709/219 |
| 5,929,849 A | 7/1999 | Kikinis | |
| 5,929,932 A | 7/1999 | Otsuki et al. | |
| 5,931,905 A | 8/1999 | Hashimoto et al. | |
| 5,937,160 A | 8/1999 | Davis et al. | |
| 5,940,073 A | 8/1999 | Klosterman et al. | |
| 5,946,386 A | 8/1999 | Rogers et al. | |
| 5,949,954 A | 9/1999 | Young et al. | |
| 5,955,988 A | 9/1999 | Blonstein et al. | |
| 5,956,716 A | 9/1999 | Kenner et al. | |
| 5,973,683 A | 10/1999 | Cragun et al. | |
| 5,977,964 A | 11/1999 | Williams et al. | |
| 5,983,236 A | 11/1999 | Yager et al. | |
| 5,987,213 A | 11/1999 | Mankovitz et al. | |
| 5,988,078 A | 11/1999 | Levine | |
| 5,990,927 A | 11/1999 | Hendricks et al. | |
| 5,991,799 A | 11/1999 | Yen et al. | |
| 6,002,394 A | 12/1999 | Schein et al. | |
| 6,002,443 A | 12/1999 | Iggulden | |
| 6,002,444 A | 12/1999 | Marshall et al. | |
| 6,005,561 A | 12/1999 | Hawkins et al. | |
| 6,005,563 A | 12/1999 | White et al. | |
| 6,005,565 A | 12/1999 | Legall et al. | |
| 6,005,597 A | 12/1999 | Barrett et al. | |
| 6,006,257 A | 12/1999 | Slezak | |
| 6,008,802 A | 12/1999 | Iki et al. | |
| 6,008,803 A | 12/1999 | Rowe et al. | |
| 6,012,086 A | 1/2000 | Lowell | |
| 6,014,184 A | 1/2000 | Knee et al. | |
| 6,016,141 A | 1/2000 | Knudson et al. | |
| 6,018,372 A | 1/2000 | Etheredge | |
| 6,020,883 A | 2/2000 | Herz et al. | |
| 6,023,267 A | 2/2000 | Chapuis et al. | |
| 6,025,837 A | 2/2000 | Matthews, III et al. | |
| 6,029,195 A | 2/2000 | Herz | |
| 6,035,091 A | 3/2000 | Kazo | |
| 6,058,238 A | 5/2000 | Ng | |
| 6,065,047 A | 5/2000 | Carpenter et al. | |
| 6,067,561 A | 5/2000 | Dillon | |
| 6,072,460 A | 6/2000 | Marshall et al. | |
| 6,075,526 A | 6/2000 | Rothmuller | |
| 6,078,348 A | 6/2000 | Klosterman et al. | |
| 6,081,750 A | 6/2000 | Hoffberg et al. | |
| 6,088,722 A | 7/2000 | Herz et al. | |
| 6,091,883 A | 7/2000 | Artigalas et al. | |
| 6,091,884 A | 7/2000 | Yuen et al. | |
| 6,097,441 A | 8/2000 | Allport | |
| 6,098,065 A | 8/2000 | Skillen et al. | |
| 6,104,334 A | 8/2000 | Allport | |
| 6,104,705 A | 8/2000 | Ismail et al. | |
| 6,125,230 A | 9/2000 | Yaginuma | |
| 6,130,726 A | 10/2000 | Darbee et al. | |
| 6,133,909 A | 10/2000 | Schein et al. | |
| 6,139,177 A * | 10/2000 | Venkatraman et al. | 700/83 |
| 6,151,643 A | 11/2000 | Cheng et al. | |
| 6,157,411 A | 12/2000 | Williams et al. | |
| 6,163,316 A | 12/2000 | Killian | |
| 6,163,345 A | 12/2000 | Noguchi et al. | |
| 6,172,674 B1 | 1/2001 | Etheredge | |
| 6,177,931 B1 | 1/2001 | Alexander et al. | |
| 6,181,335 B1 | 1/2001 | Hendricks et al. | |
| 6,184,877 B1 | 2/2001 | Dodson et al. | |
| 6,208,384 B1 | 3/2001 | Schultheiss | |
| 6,212,553 B1 | 4/2001 | Lee et al. | |
| 6,216,264 B1 | 4/2001 | Maze et al. | |
| 6,233,734 B1 | 5/2001 | Macrae et al. | |
| 6,237,049 B1 | 5/2001 | Ludtke | |
| 6,240,555 B1 | 5/2001 | Shoff et al. | |
| 6,262,722 B1 | 7/2001 | Allison et al. | |
| 6,263,501 B1 | 7/2001 | Schein et al. | |
| 6,266,814 B1 | 7/2001 | Lemmons et al. | |
| 6,268,849 B1 | 7/2001 | Boyer et al. | |
| 6,310,886 B1 | 10/2001 | Barton | |
| 6,317,885 B1 * | 11/2001 | Fries | 725/109 |
| 6,327,049 B1 | 12/2001 | Ohtsuka | |
| 6,331,877 B1 | 12/2001 | Bennington et al. | |
| 6,335,963 B1 | 1/2002 | Bosco | |
| 6,341,374 B2 | 1/2002 | Schein et al. | |
| 6,357,043 B1 | 3/2002 | Ellis et al. | |
| 6,359,636 B1 | 3/2002 | Schindler et al. | |
| 6,373,528 B1 | 4/2002 | Bennington et al. | |
| 6,388,714 B1 | 5/2002 | Schein et al. | |
| 6,396,546 B1 | 5/2002 | Alten et al. | |
| 6,408,437 B1 | 6/2002 | Hendricks et al. | |
| 6,411,696 B1 | 6/2002 | Iverson et al. | |
| 6,437,836 B1 | 8/2002 | Huang et al. | |
| 6,463,585 B1 | 10/2002 | Hendricks et al. | |
| 6,505,348 B1 | 1/2003 | Knowles et al. | |
| 6,509,908 B1 | 1/2003 | Croy et al. | |
| 6,516,467 B1 | 2/2003 | Schindler et al. | |
| 6,526,577 B1 | 2/2003 | Knudson et al. | |
| 6,545,722 B1 | 4/2003 | Schultheiss et al. | |
| 6,546,399 B1 | 4/2003 | Reed et al. | |
| 6,564,378 B1 | 5/2003 | Satterfield et al. | |
| 6,611,654 B1 | 8/2003 | Shteyn | |
| 6,661,468 B2 | 12/2003 | Alten et al. | |
| 6,668,377 B1 | 12/2003 | Dunn | |
| 6,675,385 B1 | 1/2004 | Wang | |
| 6,675,386 B1 | 1/2004 | Hendricks et al. | |
| 6,732,369 B1 | 5/2004 | Leftwich et al. | |
| 6,742,183 B1 | 5/2004 | Reynolds et al. | |
| 6,754,904 B1 | 6/2004 | Cooper et al. | |
| 6,760,537 B2 | 7/2004 | Mankovitz | |
| 6,828,993 B1 | 12/2004 | Hendricks et al. | |
| 6,865,746 B1 | 3/2005 | Herrington et al. | |
| 6,898,762 B2 | 5/2005 | Ellis et al. | |
| 6,925,567 B1 | 8/2005 | Hirata et al. | |
| 6,983,483 B2 | 1/2006 | Maze et al. | |
| 7,013,478 B1 | 3/2006 | Hendricks et al. | |
| 7,047,241 B1 | 5/2006 | Erickson | |
| 7,050,988 B2 | 5/2006 | Atcheson et al. | |
| 7,058,635 B1 | 6/2006 | Shah-Nazaroff et al. | |
| 7,165,098 B1 | 1/2007 | Boyer et al. | |
| 7,185,355 B1 | 2/2007 | Ellis et al. | |
| 7,187,847 B2 | 3/2007 | Young et al. | |
| 7,328,450 B2 | 2/2008 | Macrae et al. | |
| 7,349,976 B1 | 3/2008 | Glaser et al. | |
| 7,363,645 B1 | 4/2008 | Hendricks | |
| 7,437,751 B2 | 10/2008 | Daniels | |
| 7,480,929 B2 | 1/2009 | Klosterman et al. | |
| 7,493,641 B2 | 2/2009 | Klosterman et al. | |
| 7,540,010 B2 | 5/2009 | Hanaya et al. | |
| 7,665,109 B2 | 2/2010 | Matthews, III et al. | |
| 7,721,307 B2 | 5/2010 | Hendricks et al. | |
| 7,757,254 B2 | 7/2010 | Shoff et al. | |
| 8,078,751 B2 | 12/2011 | Janik et al. | |
| 2002/0026496 A1 | 2/2002 | Boyer et al. | |
| 2002/0032907 A1 | 3/2002 | Daniels | |
| 2002/0048448 A1 | 4/2002 | Daniels | |
| 2002/0059599 A1 | 5/2002 | Schein et al. | |
| 2002/0112249 A1 | 8/2002 | Hendricks et al. | |
| 2002/0138840 A1 | 9/2002 | Schein et al. | |
| 2003/0005445 A1 | 1/2003 | Schein et al. | |
| 2003/0031465 A1 | 2/2003 | Blake | |
| 2003/0115602 A1 | 6/2003 | Knee et al. | |
| 2003/0163813 A1 | 8/2003 | Klosterman et al. | |
| 2003/0164858 A1 | 9/2003 | Klosterman et al. | |
| 2003/0188310 A1 | 10/2003 | Klosterman et al. | |

(56) References Cited

U.S. PATENT DOCUMENTS

| | | |
|---|---|---|
| 2003/0188311 A1 | 10/2003 | Yuen et al. |
| 2003/0196201 A1 | 10/2003 | Schein et al. |
| 2003/0208756 A1 | 11/2003 | Macrae et al. |
| 2003/0208758 A1 | 11/2003 | Schein et al. |
| 2004/0078815 A1 | 4/2004 | Lemmons et al. |
| 2004/0103439 A1 | 5/2004 | Macrae et al. |
| 2004/0139465 A1 | 7/2004 | Matthews et al. |
| 2004/0210935 A1 | 10/2004 | Schein et al. |
| 2004/0221310 A1 | 11/2004 | Herrington et al. |
| 2005/0015815 A1 | 1/2005 | Shoff et al. |
| 2005/0138660 A1 | 6/2005 | Boyer et al. |
| 2005/0204388 A1 | 9/2005 | Knudson et al. |
| 2005/0229215 A1 | 10/2005 | Schein et al. |
| 2005/0235320 A1 | 10/2005 | Maze et al. |
| 2005/0267819 A1 | 12/2005 | Kaplan |
| 2005/0278741 A1 | 12/2005 | Robarts et al. |
| 2005/0283800 A1 | 12/2005 | Ellis et al. |
| 2006/0037044 A1 | 2/2006 | Daniels |
| 2007/0271582 A1 | 11/2007 | Ellis et al. |
| 2008/0178221 A1* | 7/2008 | Schein et al. ............... 725/42 |
| 2008/0184308 A1 | 7/2008 | Herrington et al. |
| 2008/0184312 A1 | 7/2008 | Schein et al. |
| 2008/0184319 A1 | 7/2008 | Mankovitz |
| 2008/0235725 A1 | 9/2008 | Hendricks |
| 2008/0288980 A1 | 11/2008 | Schein et al. |
| 2009/0070817 A1 | 3/2009 | Ellis et al. |
| 2009/0077589 A1 | 3/2009 | Boyer et al. |
| 2010/0115413 A1 | 5/2010 | Schein et al. |
| 2010/0115541 A1 | 5/2010 | Schein et al. |
| 2010/0211969 A1 | 8/2010 | Schein et al. |
| 2010/0211975 A1 | 8/2010 | Boyer et al. |
| 2011/0173660 A1 | 7/2011 | Schein et al. |
| 2011/0258663 A1 | 10/2011 | Lemmons et al. |
| 2012/0079539 A1 | 3/2012 | Schein et al. |
| 2012/0272270 A1 | 10/2012 | Boyer et al. |
| 2013/0304586 A1 | 11/2013 | Angles et al. |

FOREIGN PATENT DOCUMENTS

| | | |
|---|---|---|
| DE | 31 51 492 | 7/1983 |
| DE | 36 40 436 | 6/1988 |
| DE | 42 01 031 | 7/1993 |
| DE | 42 17 246 | 12/1993 |
| DE | 42 40 187 | 6/1994 |
| DE | 44 07 701 | 9/1995 |
| DE | 44 40 419 | 5/1996 |
| DE | 195 31 121 | 2/1997 |
| DE | 197 40 079 | 3/1999 |
| EP | 0 276 425 | 8/1988 |
| EP | 0 339 675 | 11/1989 |
| EP | 0 463 451 | 1/1992 |
| EP | 0 617 563 | 9/1994 |
| EP | 0 624 040 A2 | 11/1994 |
| EP | 0 644 689 | 3/1995 |
| EP | 0 650 114 | 4/1995 |
| EP | 0 658 048 | 6/1995 |
| EP | 0 682 452 | 11/1995 |
| EP | 0 705 036 | 4/1996 |
| EP | 0 721 253 | 7/1996 |
| EP | 0 723 369 | 7/1996 |
| EP | 0 725 539 | 8/1996 |
| EP | 0 742 669 | 11/1996 |
| EP | 0 774 853 | 5/1997 |
| EP | 0 774 866 | 5/1997 |
| EP | 0 793 225 | 9/1997 |
| EP | 0 805 594 | 11/1997 |
| EP | 0 837 599 | 4/1998 |
| EP | 0 852 361 | 7/1998 |
| EP | 0 854 645 | 7/1998 |
| GB | 1 554 411 | 10/1979 |
| GB | 2265792 A | 10/1993 |
| GB | 2325537 A | 11/1998 |
| JP | 62-060372 | 3/1987 |
| JP | 63092177 | 4/1988 |
| JP | 10-42235 A | 2/1989 |
| JP | 10-93933 A | 4/1989 |
| JP | 03-022770 | 1/1991 |
| JP | 04079053 | 3/1992 |
| JP | 04227380 A | 8/1992 |
| JP | 05260400 A | 10/1993 |
| JP | 05-314186 | 11/1993 |
| JP | 06021907 A | 1/1994 |
| JP | 06038165 | 2/1994 |
| JP | 06-124309 | 5/1994 |
| JP | 06504165 T | 5/1994 |
| JP | 06-217271 | 8/1994 |
| JP | 06243539 | 9/1994 |
| JP | 06-350546 | 12/1994 |
| JP | 0721619 | 1/1995 |
| JP | 07-135621 A | 5/1995 |
| JP | 07123326 A | 5/1995 |
| JP | 07-162776 | 6/1995 |
| JP | 07147657 A | 6/1995 |
| JP | 07154349 A | 6/1995 |
| JP | 07160732 | 6/1995 |
| JP | 07184131 A | 7/1995 |
| JP | 07193762 A | 7/1995 |
| JP | 07193763 A | 7/1995 |
| JP | 07-212732 | 8/1995 |
| JP | 0720254 | 11/1995 |
| JP | 08-056352 | 2/1996 |
| JP | 0832528 | 2/1996 |
| JP | 08032538 A | 2/1996 |
| JP | 08125497 A | 5/1996 |
| JP | 08506941 | 7/1996 |
| JP | 08251122 A | 9/1996 |
| JP | 08275077 A | 10/1996 |
| JP | 09-009245 | 1/1997 |
| JP | 09-070020 | 3/1997 |
| JP | 09-102827 | 4/1997 |
| JP | 09-162821 | 6/1997 |
| WO | WO-86/01359 | 2/1986 |
| WO | WO-87/03766 | 6/1987 |
| WO | WO-89/03085 | 4/1989 |
| WO | WO-94/14282 | 6/1994 |
| WO | WO-94/14284 | 6/1994 |
| WO | WO-9413107 | 6/1994 |
| WO | WO-95/10910 | 4/1995 |
| WO | WO-9515657 | 6/1995 |
| WO | WO-9515658 A1 | 6/1995 |
| WO | WO-9519092 | 7/1995 |
| WO | WO 95/26095 | 9/1995 |
| WO | WO-9526608 | 10/1995 |
| WO | WO-9528799 | 10/1995 |
| WO | WO-95/32583 A1 | 11/1995 |
| WO | WO-95/32585 | 11/1995 |
| WO | WO 95/33338 | 12/1995 |
| WO | WO-9613013 A1 | 5/1996 |
| WO | WO-96/21990 A2 | 7/1996 |
| WO | WO-9627989 | 9/1996 |
| WO | WO 96/37983 | 11/1996 |
| WO | WO-96/37996 | 11/1996 |
| WO | WO-9638962 | 12/1996 |
| WO | WO-97/31480 | 8/1997 |
| WO | WO-97/36422 | 10/1997 |
| WO | WO-97/47106 | 12/1997 |
| WO | WO-97/47143 | 12/1997 |
| WO | WO-9745786 | 12/1997 |
| WO | WO-9817063 A1 | 4/1998 |
| WO | WO-9821664 | 5/1998 |
| WO | WO-9821877 | 5/1998 |
| WO | WO-98/56173 | 12/1998 |
| WO | WO-98/56176 | 12/1998 |
| WO | WO-99/04570 | 1/1999 |
| WO | WO-9901984 | 1/1999 |
| WO | WO-99/60783 | 11/1999 |
| WO | WO 2005/027512 | 3/2005 |
| WO | WO-98/16062 | 6/2007 |

OTHER PUBLICATIONS

"Honey, is there anything good on the remote tonight?", advertisement from Multichannel News, Broadband Week Section, p. 168, Nov. 30, 1998.

(56) References Cited

OTHER PUBLICATIONS

"How Evolve Works," from the Internet at http://www.evolveproducts.com/network.html, printed on Dec. 28, 1998.

"Reaching your subscribers is a complex and costly process-until now," from the Internet at http://www.evolveproducts.com/info.html, printed on Dec. 28, 1998.

"Sun's Next Steps in Digital Set-Tops," article in Cablevision, p. 56, Nov. 16, 1998.

"The Evolve EZ Guide. The Remote Control," from the Internet at http://www.evolveproducts.com/display2.html, printed on Dec. 28, 1998.

"What is Jini?", from the Internet at http://java.sun.com/products/jini/whitepapers/whatsjini.pdf, printed on Jan. 25, 1999.

"Why Jini Now?", from the internet at http://java.sun.com/products/jini/whitepapers/whyjininow.pdf, printed on Jan. 25, 1999. The document bears a copyright date of 1998.

Compton et al., "Internet CNN Newsroom: A digital video news magazine and library," Proc. Of the Intl. Conf. on Multimedia Computing and Systems. Washington, May 15-18, 1995; [Proceedings of the International Conference on Multimedia Computing and Systems], Los Alamitos, IEEE Comp. Soc. Press, U.S., May 15, 1995, pp. 296-301, XP010154611.

Karunanithi et al., "A Feature-Based Neural Network Movie Selection Approach," Proc. Intl. Workshop on Applications of Neural Networks to Telecommunications, Stockholm, Sweden, May 22-24, 1995, pp. 162-169.

Katkere et al., "Interactive Video on WWW: Beyond VCR-like Interfaces," Computer Networks and ISDN Systems, vol. 28, Issue 11, 1996, pp. 1559-1572.

Khoo et al., "An Expert System Approach to Online Catalog Subject Searching," Information Processing & Management: An International Journal, vol. 30, No. 2, 1994, pp. 223-238.

Melton, "The Uniden Super 4800," OnSat magazine, Jun. 10-16, 1990, pp. 2-4.

Personal Entertainment Guide—User's Guide, Version 1.0, Copyright 1991 by Lookahead Communications Inc.

SuperGuide/Uniden 4800, "A Quick Guide to Programming the Uniden 4800—Dealer Set-Up Manual," undated, 8 pages.

SuperGuide/Uniden 4800, "A User's Guide to SuperGuide's™ Features," undated, 12 pages.

Uniden®, UST-4800, Integrated Receiver/Descrambler, Installation Guide, copyright 1990, 60 pages.

Uniden®, UST-4800, Integrated Receiver/Descrambler, Operating Guide, copyright 1990, 24 pages.

Uniden®, UST-4800 Super, Integrated Receiver/Descrambler, Preliminary Reference Manual, Nov. 12, 1991, 80 pages.

Whale, "Identification of Program Similarity in Large Populations," The Computer Journal, vol. 33, No. 2, 1990, pp. 140-146.

"A Financial Times Survey: Viewdata (Advertisement)," Financial Times, Mar. 20, 1979.

"TV Guide going online," Broadcasting & Cable, pp. 49-52 (Jun. 13, 1994).

"Presenting Java," John December, Sams.net Publishing, published Sep. 20, 1995.

"TV Listing Star on the Computer," Eckoff, J.,Central Penn Business Journal, High Beam Research (Mar. 15, 1996).

Defence and Counterclaim of the First and Second Defendants, No. HC11 C 04556, between Starsight Telecast and United Video Properties (Claimants) and Virgin Media, Virgin Media Payments, and TiVo Defendants (pp. 10-11) (Mar. 14, 2012).

"Dialing the printed page," ITT in Europe Profile, 11/Spring 1977.

"Electronic Program Guide via Internet," Research Disclosure, Kenneth Mason Publications, Hampshire, GB Nr. 385 (May 1996) p. 276, ISSN:0374-4353.

"Growing US interest in the impact of viewdata," Computing Weekly, Jul. 20, 1978.

"Open TV fur interaktives Fernsehen," Trend & Technik, 9-95 RFE, p. 100. (English language translation attached.).

"Prodigy Launches Interactive TV Listing," Apr. 22, 1994, Public Broadcasting Report.

"Teletext presents the alternative view," Financial Times, Oct. 24, 1977.

"Three men on a Viewdata bike," The Economist, Mar. 25, 1978.

"TV Guide Online Set for Fall," Entertainment Marketing Letter, Aug. 1994.

"UVSG Offers System-Specific Web Site Development for OPS," press release of United Video Satellite Group, Apr. 12, 1996.

"UVSG Teams With Microsoft on Internet Information Server," press release of United Video Satellite Group, Feb. 22, 1996.

"Viewdata and its potential impact in the USA: Final Report/Volume One, The UK Experience," Link and Butler Cox & Partners Limited, Oct. 1978.

"Viewdata moves in US but GEC may lose out," Computing Weekly, Jan. 25, 1978.

"Viewdata Service Terminal Specification," British Post Office, Issue 5, Aug. 1978.

"Web TV and Its Consumer Electronics Licensees Debut First Internet Television Network and Set-Top Box," Jul. 10, 1996 <http://www.ohlfs.com/keith/self/webtv/home/HTML/home.license.html>.

ACM Multimedia 93 Proceedings, "A Digital On-Demand Video Service Supporting Content-Based Queries," Little et al. pp. 427-436, Jul. 1993.

Armstrong, L., "Channel-Surfing's next wave: Henry Yuen's interactive TV guide takes on TCI and Viacom," BusinessWeek, Jul. 31, 1995.

Arnold, W.F., "Britain to get wired city—via telephone," Electronics, Mar. 4, 1976, at 76.

Blahut et al., "Interactive Television," Proceedings of the IEEE, Jul. 1995.

Boyd-Merritt, R., "Television wires two-way video," Electronic Engineering Times, Apr. 25, 1994.

Brugliera, V., "Digital On-Screen Display: A New Technology for the Consumer Interface" (Jun. 1993).

Day, R., "The Great PC/TV Debate," OEM Magazine, Jul. 1, 1996.

DIRECTV Plus2 System, Thompson Consumer Electronics, Inc. (1999).

DiRosa, S., "BIGSURF Netguide," Jul. 1995, vol. 3.1 (Sections 18, 21, and 28—renumbered as pp. 1-27).

Eitz, Gerhard, "Zukünftige Informations-Und Datenangebote Beim Digitalen Fernsehen—EPG Und "Lesezeichen"," Rundfunktechnische Mitteilungen, vol. 41, pp. 67-72, Jun. 1997.

Hobbes Internet Timeline, Mar. 22, 2007.

Holland, G. L., "NAPLPS standard defines graphics and text communications," EDN, Jan. 10, 1985, at 179.

Iizuka et al., Building Internet TV Guide Service 1 and 2, the 53rd National Conference Proceedings, Japan, Information Processing Society of Japan, Sep. 6, 1996 p. 3-227 to 230. (English).

Instruction Manual Using StarSight 2, StarSight Telecast, Inc., 1994.

Kai et al., "Development of a Simulation System for Integrated Services Television," Report from Information Processing Society of Japan, Japan, Sep. 13, 1996, vol. 96, No. 90 p. 13-20.

Keith Lynch's timeline of net related terms and concepts, Mar. 22, 2007.

Large, P., "Throw away the books—Viewdata's coming," Guardian, Jan. 10, 1978.

Large, P., "Viewdata, the invention that brings boundless advice and information to the home, also sets a test for the Post Office," Financial Guardian, Jun. 29, 1978.

Leftwich et al., *StarSight Interactive Television Program Guide, Phase III*, Functional/Interactional Architecture Specification Document, Orbit Interaction, Palo Alto, California.

Leftwich et al., *StarSight Interactive Television Program Guide, Phase IV*, Functional/Interactional Architecture Specification Document, Orbit Interaction, Palo Alto, California, published before Apr. 19, 1995.

LISTS>What's on Tonite TV Listings Internet Article, [Online], Jan. 28, 1995, XP002378869 Retrieved from the Internet: URL: www.scout.wisc.edu/Projects/PastProjects/NH/95-01-31/0018.html> [retrieved on Apr. 28, 2006] the whole document.

Lloyd, J., "Impact of technology," Financial Times, Jul. 1978.

(56) References Cited

OTHER PUBLICATIONS

Miller, M.D., "A Scenario for the Deployment of Interactive Multimedia Cable Television Systems in the United States in the 1990s," IEEE, 1994.
Money, S.A., "Teletext and Viewdata," Butterworth & Co. Ltd., London, 1979.
Mosley, J.D., "NAPLPS chip sets, though scarce, satisfy limited US videotex demand," EDN, Mar. 21, 1985, at 57.
Neumann, Andreas, "WDR Online Aufbau Und Perspektiven Automatisierter Online-Dienste Im WDR," Rundfunktechnische Mitteilungen, vol. 41, pp. 56-66, Jun. 1997.
Owen, K., "How dial-a-fact is coming closer to home," The Times, Sep. 30, 1977.
Owen, K., "Why the Post Office is so excited by its plans for a TV screen information service," The Times, Sep. 26, 1976.
Periodical Funkschau, vol. Nov. 1994, pp. 78-79: Dial M for Movie.
Poole, J., "Demand for Viewdata grows," Sunday Times, Feb. 10, 1977.
Printout from Google News Archives, Mar. 22, 2007.
Qayyum, H., "Using IVDS and VBI for Interactive Television," IEEE, Jun. 10, 1996.
Rajapakshe et al., "Video on demand," (last modified Jun. 1995) <http://www-dse.doc.ic.ac.uk/~nd/suprise_95 /Journal/vol4/shr/report.html>.
Rath et al., "Set-Top Box Control Software: A Key Component in Digital Video," Philips Journal of Research, vol. 50, No. ½, 1996, at 185.
Rogers, C., "Telcos vs. Cable TV: the Global View," Data Communications, vol. 13, pp. 75-80 (Sep. 21, 1995).
Rosch, G. D., "New data and information system set for commercial market trial," Telephony, Mar. 20, 1978, at 96.
Ruffler et al., "InfoRadio on Demand, WebTV and digiTaz—Telecommerce Case Studies," May 23, 1996.
Ryan, M., "Interactive TV Takes a Corporate Twist," Electronic Engineering Times, Jul. 10, 1995.
Schauer, Tom: Internet Article, [Online] Sep. 28, 1995, XP002378870, Retrieved from the Internet: URL: www.vision2020.moscow.com/Archives/1995/9509/0058.htlm> [retrieved on Apr. 28, 2006] the whole document.
Schmuckler, Eric, "A marriage that's made in cyberspace (television networks pursue links with online information services)," May 16, 1994, MEDIAWEEK, v4, n20, p22 (3).
Selected pages from the "BBC Online—Schedules" web page. This web page is located at http://www.bbc.co.uk/schedules/ (as printed from the Internet on Oct. 19, 1999 and being dated as early as May 24, 1997).
Sharpless et al., "An advanced home terminal for interactive data communication," Conf. Rec. Int. Conf. Commun. ICC '77, IEEE, Jun. 12-15, 1977, at 19.6-47.
St. John Sandringham, "Dress rehearsal for the PRESTEL show," New Scientist, Jun. 1, 1978, at 586.
Statement in an Examination Report dated Aug. 2, 1999 for a counterpart foreign application filed in New Zealand in which the foreign Examiner alleges that he has used "the Internet to access television listings for BBC World television as far back as mid 1996 . . . ".
Stickland, D.C., "It's a common noun," The Economist, Jun. 5, 1978.
Stokes, A., "The viewdata age: Power to the People," Computing Weekly, Jan. 1979.
The clickTV television program guide website of TVData of Queensbury, New York. This website is located at www.clicktv.com (as printed from the Internet on Aug. 13, 1997).
The InfoBeat television program guide website of InfoBeat, Inc. This website is located at www.infobeat.com (as printed from the Internet on Dec. 8, 1997).
The television program guide website of Gist Communications, Inc. of New York, New York. This website is located at www.gist.com (as printed from the Internet on Aug. 14, 1997).
The television program guide website of TV Guide Entertainment Network. This website is located at www.tvguide.com (as printed from the Internet on Aug. 14-22, 1997).
TV Guide movie database Internet web pages printed on Aug. 12, 1999 (9 pages).
VideoGuide, Videoguide User's Manual, pp. 1-27.
Waldo, Jim, "JiniTM Architecture Overview," from the Internet at http://Java.sun.com/products/jini/whitepapers/architectureoverview.pdf/ printed on Jan. 25, 1999. The document bears a copyright date of 1998.
Whitehorn, K., "Viewdata and you," Observer, Jul. 30, 1978.
Wikipedia article on CompuServe, Mar. 22, 2007.
Wittig, H. et al., Intelligent Media Agents in Interactive Television Systems Proceedings of the International Conference on Multimedia Computing and Systems, Los Alamitos, CA, US, May 15, 1995,—May 18, 1995, pp. 182-189, XP00603484 p. 183, left hand column, paragraph 2, p. 184, right-hand column, paragraph 2 figure 4.
Yoshida, J., "Interactive TV a Blur," Electronic Engineering Times, Jan. 30, 1995.
Hauptmann et al., "News on Demand," News-on-Demand: An Application Informedia® Technology D-Lib Magazine, (Sep. 13, 1995), XP002675162, Retrieved from the Internet: URL:http://www.dlib.org/dlib/september95/nod/page3/html[retrieved on May 2, 2012].
Neue, Digitale Strategien Bericht Von Den 5. Dermastaedter Fernsehtagen, FKT Fernseh Und Kinotechnik, vo. 49, No. 3, Mar. 1, 1995, pp. 135-139, XP000507348, Fachverlag Schiele & Schon GmbH., Berlin, DE ISSN: 140-9947.
"A Wonderworld of Services," The Sunday Times, Innovation section, p. 4, Jan. 7, 1996.
Buchholz et al., "Revolution auf dem Bildschirm—Die neuen Medien Videotext and Bildschirmtext," Wilhelm Goldmann Verlag, Munich, Germany, copyright 1979, pp. 24-33 and 36-39. (Concise explanation included in IDS letter.).
"Columbia House CD-ROM Direct: Detail Page" accessed from the internet at http://web.archive.org/web/19961221160255/http://www.columbiahouse.com/cd/cgis . . . , copyright 1996, printed on Sep. 19, 2013.
"Columbia House CD-ROM Direct: Download Demos!," accessed from the internet at http://web.archive.org/web/19961221095819/http://www.columbiahouse.com/cd/cgis . . . , copyright 1996, printed on Sep. 19, 2013.
"Columbia House CD-ROM Direct: Member Center," accessed from the internet at http://web.archive.org/web/19961221085905/http://www.columbiahouse.com/repl/cd/ . . . , copyright 1996, printed on Sep. 19, 2013.
"Columbia House CD-ROM Direct: Member Center," copyright 1996.
"Columbia House CD-ROM Direct: The Connection," accessed from the internet at http://web.archive.org/web/19961221100721/http://www.columbiahouse.com/repl/cd/ . . . , copyright 1996, printed on Sep. 20, 2013.
"Columbia House CD-ROM Direct: The Connection," accessed from the internet at http://web.archive.org/web/19961223152924/http://www.columbiahouse.com/repl/cd/ . . . , copyright 1996, printed on Sep. 20, 2013.
"Columbia House Laser Disc Club: FAQ Answers," accessed from the internet at http://web.archive.org/web/19961223165516/http://www.columbiahouse.com/repl/lc/t . . . , copyright 1996, printed on Sep. 20, 2013.
"Columbia House Laser Disc Club: Join the Club," accessed from the internet at http://web.archive.org/web/19961221094037/http://www.columbiahouse.com/repl/lc/t . . . , copyright 1996, printed on Sep. 20, 2013.
"Columbia House Music Club: Join the Club," accessed from the internet at http://web.archive.org/web/19961221091101/http://www.columbiahouse.com/repl/mc . . . , copyright 1996, printed on Sep. 20, 2013.
"Columbia House Music Club: Search," accessed from the internet at http://web.archive.org/web/19961221114653/http://www.columbiahouse.com/repl/mc . . . , copyright 1996, printed on Sep. 19, 2013.
"Columbia House Music Club: Shopping Cart," accessed from the internet at http://web.archive.org/web/19961221120941/http://www.columbiahouse.com/mc/cgis . . . , copyright 1996, printed on Sep. 19, 2013.

(56) References Cited

OTHER PUBLICATIONS

"Columbia House Video Club: Essential Collection," accessed from the internet at http://web.archive.org/web/19961221113 1908/http://www.columbiahouse.com/vc/cgis/j . . . , copyright 1996, printed on Sep. 20, 2013.
Draft Grounds of Invalidity for EP (UK) 0 880 856 (Trial B), No. HC11 C 04556, between Starsight Telecast and United Video Properties (Claimants) and Virgin Media, Virgin Media Payments, and TiVo (Defendants), 7 pgs., Oct. 2013.
"GameSpot: Allied General at a Glance," accessed from the internet at http://web.archive.org/web/19970205153530/http://www.gamespot.com/strategy/allie . . . , copyright 1996, printed on Sep. 19, 2013.
"GameSpot: Allied General—Download It Now!!!!," accessed from the internet at http://web.archive.org/web/19970206133452/http://www.gamespot.com/strategy/allie . . . , copyright 1997, printed on Sep. 19, 2013.
"GameSpot's Downloads for Allied General," accessed from the internet at http://web.archive.org/web/19970205060703/http://www.gamespot.com/strategy/allie . . . , copyright 1997, printed on Sep. 19, 2013.
"Gateway Destination: The PC for the Office and the Family Room," PC Magazine, First Looks section, pp. 39-41, Jun. 11, 1996.
Ryan, K., "Free Interactive TV Guide," Google Newsgroup, Alleged Date Sep. 29, 1995.
"Step Up to the Superhighway," The Sunday Times, Innovation section, p. 6, Jan. 7, 1996.
"The Columbia House Video Club: Download Software," accessed from the internet at http://web.archive.org/web/19961223163101/http://www.columbiahouse.com/repl/vc . . . , copyright 1996, printed on Sep. 19, 2013.
"Welcome to Columbia House Online," accessed from the internet at http://web.archive.org/web/19961221085121/http://www.columbiahouse.com/, copyright 1996, printed on Sep. 19, 2013.
Williams, David M., and Perry, Burt, "Rich Online Services as the Archetype for Interactive TV," Cable '94, Proceedings from Twelve Technical Sessions, 43rd Annual Convention and Exposition of the National Cable Television Association, May 22-25, 1994, New Orleans, LA., Technical Paper Compiled by Katherine Rutkowski, National Cable, XP008161201, pp. 21-35.
"Yearling's Free Personalised TV Guide," from the internet at http://www.yearling.com/, Dec. 30, 1996.
"Does NBC Get It," Aug. 14, 1995, retrieved from the internet at http://www.open4success.org/db/bin19/019687.html, retrieved on Dec. 11, 2013.
"Prevue Channel Sep. 1, 1995 (part 1)," PrevueGuide, Sep. 1, 1995, from the internet at http://www.youtube.com/watch?v=OVul78nH6RY, retrieved on Nov. 26, 2013, 1 pg.
"Today's Stop: What's on Tonite," Oct. 3, 1995, retrieved from the internet at http://internettourbus.com/arch/1995/TB100395.TXT, retrieved on Dec. 9, 2013.
"What's on Tonite!," Jan. 28, 1995, retrieved from the internet at http://www.library.georgetown.edu/newjour/publication/whats-tonite-tm, retrieved on Dec. 11, 2013.
Chen et al., "Real Time Video and Audio in the World Wide Web," Proc. 4th World Wide Web Conference, 1995.
Dr. Dobb's, "Implementing a Web Shopping Cart," from the internet at https://www.drdobbs.com/article/print?articleId=184409959 &siteSect . . . , Sep. 1, 1996, printed from the internet on Sep. 13, 2012.
Fry et al., "Delivering QoS Controlled Continuous Media on the World Wide Web," Proceedings of the 4th International IFIP Workshop on QoS, Paris, Mar. 6-8, 1996.
"Hobbes' Internet Timeline 10.2," by Robert H'obbes' Zakon, from the internet at http://www.zakon.org/robert/internet/timeline/, printed from the internet on Sep. 13, 2012.
"Internet User Forecast by Country," Computer Industry Almanac—Press Release, from the internet at http://www.c-i-a.com/internetusersexec.html, printed from the internet on Sep. 13, 2012.
Little et al., "Prospects for Interactive Video-on-Demand," IEEE Multimedia, Fall 1994, pp. 14-24.
Loen et al., "Subscriber Terminal Units for Video Dial Tone Systems," IEEE Network, Sep./Oct. 1995, pp. 48-57.
Savage, "Internet's 'What's on Tonite!' Tells You Just That and More," The News, InfoWatch, May 29, 1995.
Wikipedia article, "Geschichte des Internets," from the internet at http://de.wikipedia.org/wiki/Geschichte_des_Internets, page last modified on Apr. 28, 2012, printed from the internet on May 18, 2012. (Concise explanation included in IDS letter.).
Wikipedia article, "Internet Explorer," from the internet at http://de.wikipedia.org/wiki/Internet_Explorer, page last modified on Sep. 9, 2012, printed from the internet on Sep. 13, 2012. (Concise explanation included in IDS letter.).
Wikipedia article, "MSN TV," from the internet at http://en.wikipedia.org/wiki/MSN_TV, page last modified on May 15, 2012, printed from the internet on Sep. 13, 2012.
Wikipedia article, "NCSA Mosaic," from the internet at http://de.wikipedia.org/wiki/NCSA_Mosaic, page last modified on Sep. 3, 2012, printed from the internet on Sep. 13, 2012. (Concise explanation included in IDS letter.).
Harada, Mamoru et al., "Internet de telebi housou ga hajimaru," ("Television Broadcasting Starts with the Internet"), Nikkei Electronics, Japan, Nikkei BP, No. 653, Jan. 15, 1996, pp. 67-75. (Concise Explanation included in IDS letter.).
Ikejiri, Minoru et al., "Maruchimedia wo riido suru apurikeishon kaihatu," ("Application Development for Leading Multimedia"), Journal of NTT Technologies, Japan, The Telecommunications Association of Japan, vol. 7, No. 9, Sep. 1, 1995, pp. 48-55. (Concise Explanation included in IDS letter.).
Okimi, Katsuya et al., "Shinban ISDN," ("New ISDN Edition"), Japan, Ohmsha, Ltd., First Edition, Oct. 5, 1995, pp. 261-285. (Concise Explanation included in IDS letter.).

* cited by examiner

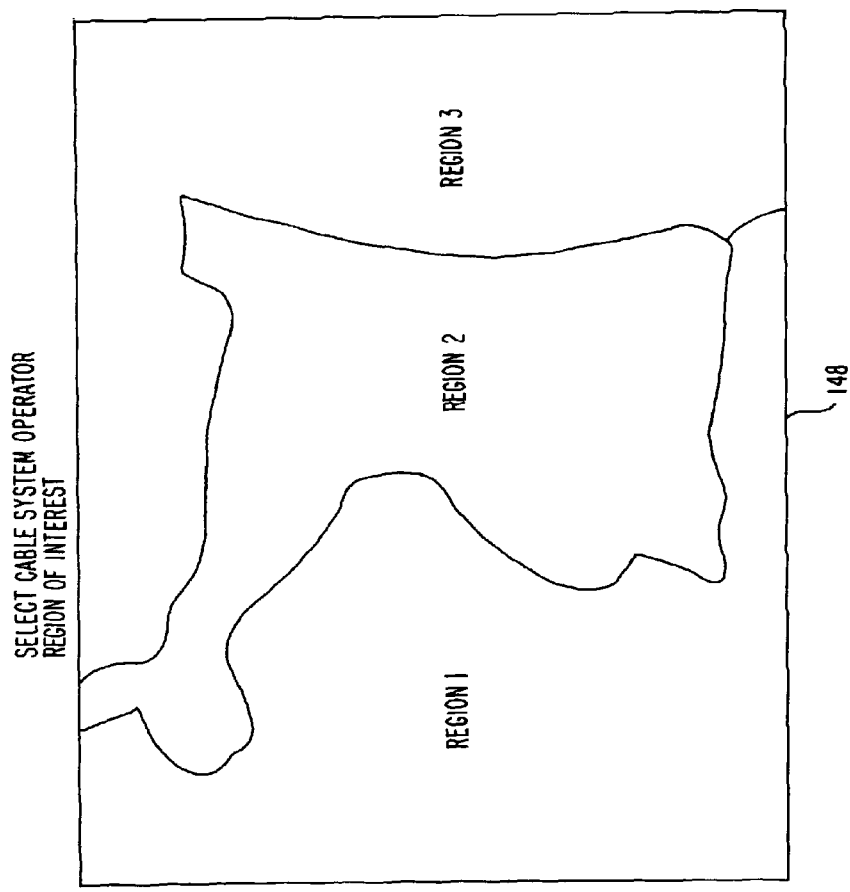

FIG. 7

SORRY, LOCAL LISTINGS ARE NOT CURRENTLY AVAILABLE IN YOUR AREA.
LOCAL LISTINGS ON PREVUE ONLINE ARE A SEPARATE SERVICE FROM THE PREVUE CHANNEL. YOUR CABLE COMPANY WILL NEED TO SUBSCRIBE TO THIS SERVICE IN ORDER FOR YOU TO GET TO LOCAL LISTINGS. WE OFFER NATIONAL LISTINGS FOR THOSE AREAS NOT YET COVERED, AND WE'RE CONTACTING CABLE SYSTEMS AS FAST AS WE CAN. PLEASE FILL OUT THE FORM BELOW TO FORWARD TO YOUR TO CABLE COMPANY. THANKS FOR YOUR SUPPORT!

YOUR E-MAIL ADDRESS
YOUR CABLE PROVIDER
YOUR ZIP CODE
COMMENTS

SUBMIT  RESET FORM

FIG. 9

Help us to serve you better

TO BETTER BRING YOU THE TV ENTERTAINMENT YOU WANT MOST,
WE NEED A LITTLE INFORMATION FIRST

YOUR E-MAIL ADDRESS [         ]

MODEM CONNECT SPEED
☐ 14.4bps  ☐ 28.8bps  ☐ 33.6bps  ☐ ISDN  ☐ T-1

PROCESSOR SPEED
☐ 486 PC OR SLOWER
☐ PENTIUM PC           ☐ 68K MACINTOSH
☐ UNIX OR OTHER        ☐ POWER MACINTOSH

[SUBMIT] [RESET]

FIG. 18

| TIME & DATE | 2KCBS DESCRIPTION |
|---|---|
| 11:00AM | COLLEGE FOOTBALL: ARMY VS. NAVY |
| 2:30PM | COLLEGE BASKETBALL KANSAS AT UCLA |
| 3:00PM | PAID PROGRAM |
| 3:30PM | PAID PROGRAM |
| 6:00PM | BEACH PATROL |
| 7:00PM | COAST GUARD |
| 7:30PM | CBS EVENING NEWS |
| 8:00PM | ENTERTAINMENT TONIGHT |
| 9:00PM | DR QUINN, MEDICINE WOMAN |
| 10:00PM | EARLY EDITION |
| 11:00PM | |
| SUN 08 | |
| 12:00AM | WALKER, TEXAS RANGER |

WHAT'S ON BY PREVUE INTERACTIVE...

UPN | TIME | CHANNEL
CATEGORY | SEARCH

SELECT DAY TO VIEW
S M T W T F S
      1  2  3  4  5  6  7
8  9 10 11 12 13 14
15 16 17 18 19 20 21

SELECT TIME OF DAY
EARLY MORNING | AFTERNOON
MID-DAY | 
PRIME TIME | LATE NITE
CURRENT

STAR TREK VOYAGER

FIG. 20

LISTING FOR GENRE-MOVIE — 264

| TIME & DATE | CHANNEL | |
|---|---|---|
| SAT 07 12:00PM | 21 AMC | LAND OF THE PHARAOHS |
| SAT 07 12:00PM | 36 REQ | THE CRAFT |
| SAT 07 12:00PM | 96 TCM | IN THE GOOD OLD SUMMERTIME |
| SAT 07 12:25PM | 99 ENCORE | SEX AND THE SINGLE GIRL |
| SAT 07 12:30PM | 25 SHOW | MAD LOVE |
| SAT 07 12:30PM | 95 FLIX | MOTHER JUGS & SPEED |
| SAT 07 1:00PM | 98 SPICE | EROTIC PRINCESS |
| SAT 07 1:00PM | 26 TMC | BABETTES FEAST |
| SAT 07 1:00PM | 35 REQ | THE BIRDCAGE |

266

WHAT'S ON BY PREVUE INTERACTIVE

270

| TIME | CHANNEL |
|---|---|
| CATEGORY | SEARCH |

SELECT DAY TO VIEW

| S | M | T | W | T | F | S |
|---|---|---|---|---|---|---|
|  | 1 | 2 | 3 | 4 | 5 | 6 | 7 |
| 8 | 9 | 10 | 11 | 12 | 13 | 14 |
| 15 | 16 | 17 | 18 | 19 | 20 | 21 |

SELECT TIME OF DAY

| EARLY MORNING |
| MID-DAY | AFTERNOON |
| PRIME TIME | LATE NITE |
| CURRENT |

UPN | GO TO | PREVUE | TCI | UPN

ENTER SEARCH TEXT: ▭ ← 276

SEARCH WITHIN:
| TITLE |
| ACTOR |
| CATEGORY |
| DESCRIPTION |
| RATING |

← 274

UPN
| TIME | CHANNEL |
| CATEGORY | SEARCH |

SELECT DAY TO VIEW
| S | M | T | W | T | F | S |
|---|---|---|---|---|---|---|
|   | 1 | 2 | 3 | 4 | 5 | 6 | 7 |
| 8 | 9 | 10 | 11 | 12 | 13 | 14 |
| 15 | 16 | 17 | 18 | 19 | 20 | 21 |

SELECT TIME OF DAY
| EARLY | MORNING |
| MID-DAY | AFTERNOON |
| PRIME TIME | LATE NITE |
| CURRENT |

FIG. 22

| TIME & DATE | CHANNEL | LISTING FOR ACTOR = GIBSON |
|---|---|---|
| TUE 10 10:00AM | 23 HBO | FOREVER YOUNG |
| TUE 10 8:00 PM | 23 HBO | FOREVER YOUNG |
| SAT 14 4:15PM | 23 HBO | FOREVER YOUNG |
| SUN 15 1:00PM | 7 KABC | TO LOVE, HONOR AND DECEIVE |
| TUE 17 4:00AM | 95 FLIX | MADMAX |
| FRI 20 8:15AM | 23 HBO | FOREVER YOUNG |
| FRI 20 7:15PM | 23 HBO | FOREVER YOUNG |

WHAT'S ON BY PREVUE INTERACTIVE...

| TIME | CHANNEL |
|---|---|
| CATEGORY | SEARCH |

SELECT DAY TO VIEW

| S | M | T | W | T | F | S |
|---|---|---|---|---|---|---|
|   | 1 | 2 | 3 | 4 | 5 | 6 | 7 |
| 8 | 9 | 10 | 11 | 12 | 13 | 14 |
| 15 | 16 | 17 | 18 | 19 | 20 | 21 |

SELECT TIME OF DAY

| EARLY | MORNING |
| MID-DAY | AFTERNOON |
| PRIME TIME | LATE NITE |
| CURRENT | |

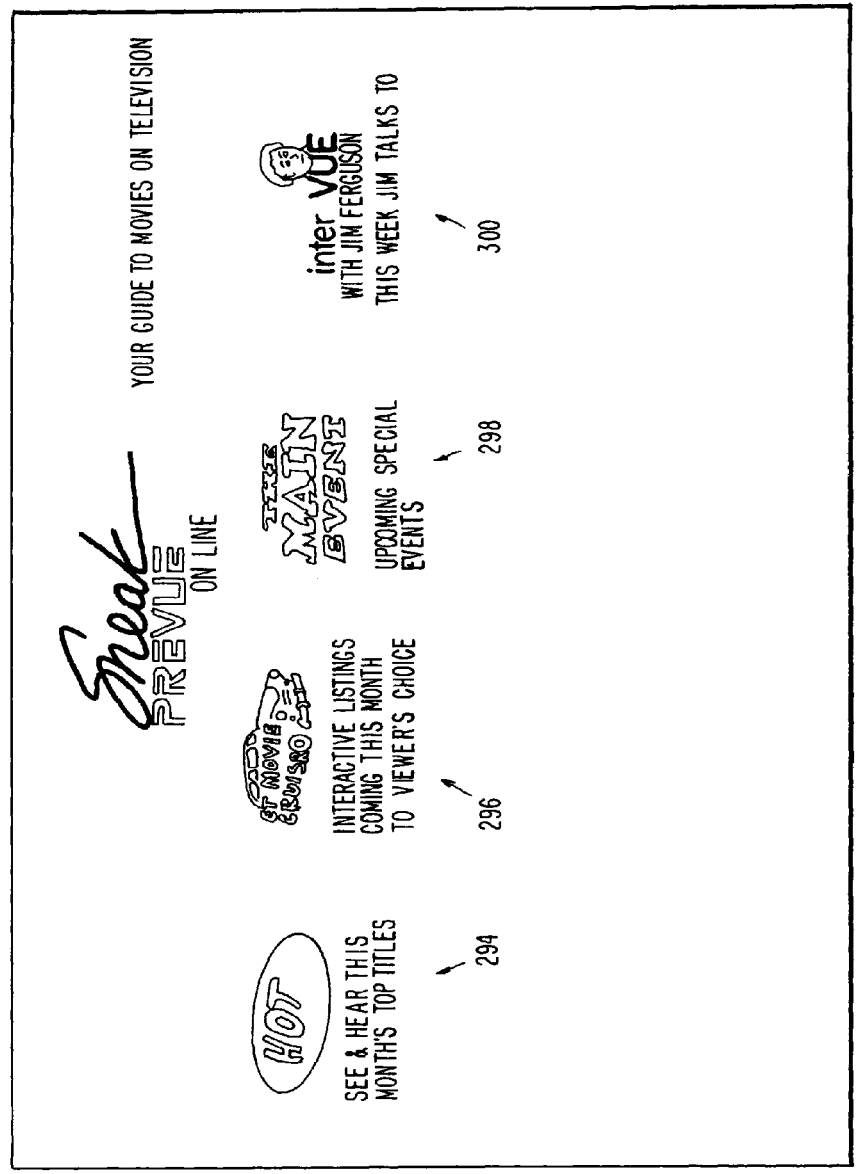

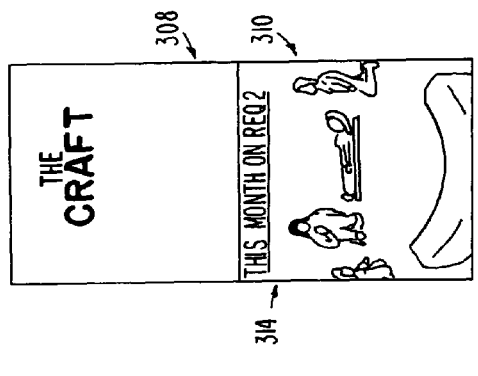
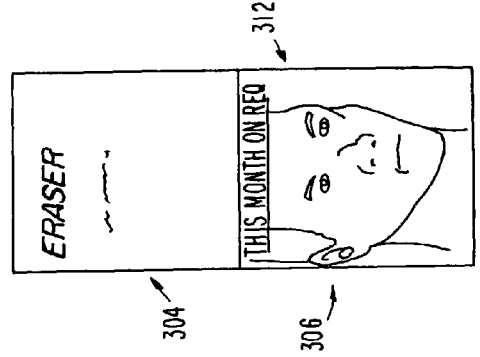
FIG. 24

FIG.26

| TIME | CHANNEL |
|------|---------|
| CATEGORY | SEARCH |

SELECT DAY TO VIEW

| S | M | T | W | T | F | S |
|---|---|---|---|---|---|---|
|   | 1 | 2 | 3 | 4 | 5 | 6 | 7 |
| 8 | 9 | 10 | 11 | 12 | 13 | 14 |
| 15 | 16 | 17 | 18 | 19 | 20 | 21 |

SELECT TIME OF DAY

| EARLY MORNING |
| MID-DAY | AFTERNOON |
| PRIME TIME | LATENITE |
| CURRENT |

Prevue 0109 TCI 316 Gillette

| TIME & DATE | 35 REQ: DESCRIPTION |
|---|---|
| 1:00PM | THE BIRDCAGE |
| 3:00PM | STEALING BEAUTY |
| 5:00PM | PRIMAL FEAR |
| 7:30PM | COUNTDOWN |
| 8:00PM | ULTIMATE ULTIMATE 1996 |
| 11:00PM | ULTIMATE ULTIMATE 1996 |
| SUN 08 | |
| 2:00AM | HEAVY METAL |
| 3:30AM | PRIMAL FEAR |
| 6:00AM | JAMES AND THE GIANT PEACH |
| 7:30AM | DONT BE A MENACE TO SOUTH CENTRAL |
| 9:00AM | HEAVY METAL |
| 10:30AM | PRIMAL FEAR |

— 324

INFO

WHAT'S ON BY PREVUE INTERACTIVE.
— 325

FIG. 27

STAR TREK VOYAGER® | TIME | CHANNEL
--- | --- | ---
 | CATEGORY | SEARCH

SELECT DAY TO VIEW

| S | M | T | W | T | F | S |
|---|---|---|---|---|---|---|
|   | 1 | 2 | 3 | 4 | 5 | 6 | 7 |
| 8 | 9 | 10 | 11 | 12 | 13 | 14 |
| 15 | 16 | 17 | 18 | 19 | 20 | 21 |

SELECT TIME OF DAY

| EARLY | MORNING |
|---|---|
| MID-DAY | AFTERNOON |
| PRIME TIME | LATE NITE |
| CURRENT | |

PREVUE | TCI — 326 — 27 DISNEY·DESCRIPTION

| TIME & DATE ← 328 | |
|---|---|
| 1:30 PM | WINNIE THE POOH AND TIGGER TOO |
| 2:00 PM | DUCK FOR HIRE |
| 2:50 PM | TOY TINKERS |
| 3:00 PM | BABY-SITTERS CLUB |
| 3:30 PM | READY OR NOT |
| 4:00 PM | TORKELSONS |
| 4:30 PM | OCEAN GIRL |
| 5:00 PM | SPELLBINDER |
| 5:30 PM | AUDUBON'S ANIMAL ADVENTURES:DOLPHINS |
| 6:00 PM | 20,000 LEAGUES UNDER THE SEA |
| 8:10 PM | AVONLEA |
| 9:00 PM | WERE BACK! A DINOSAUR'S STORY |
| 10:15 PM | PETE'S DRAGON |

PETE'S DRAGON (2:15)     FANTASY MOVIE
A LOVABLE DRAGON HELPS AN ORPHAN ESCAPE HIS FOSTER FAMILY. MICKEY ROONEY, HELEN REDDY

INFO — 330

FIG. 28

THE MAIN EVENT

332

LIVE SPORTS EVENTS THIS MONTH ON PAY-PER-VIEW

BOXING: TYSON VS. HOLYFIELD ← 334

CLICK FOR VIDEO

THIS WEEK'S EPISODE
UPN-SENTINEL-TS211

TENSION RUNS HIGH AS ELLISON SEARCHES FOR A
SERIAL BOMBER WHO IS TARGETING AFRICAN
AMERICAN CHURCHES.

GUEST STARRING:

KIMBERLY ELISE AS CANDANCE BLAKE, KEN
EARL AS CAPTAIN TAGGERT, MICHEL KOPSA AS
DIRK LARSON, KIRK B.R. WOLLER AS ALEX

PROGRAM OVERVIEW:

RUGGED POLICE DETECTIVE JAMES ELLISON (RICHARD
BURGI) AND GOOD-NATURED ANTHROPOLOGIST
GRADUATE STUDENT BLAIR SANDBURG (GARETT
MAGGART) BECOME AN IMPROBABLE TEAM WHEN THE
RENEGADE DETECTIVE DEVELOPS A DRAMATICALLY
DIFFERENT ADVANTAGE—HIS FIVE SENSES ARE
HEIGHTENED WILDLY BEYOND THAT OF AN ORDINARY
HUMAN BEING—AND THE HIP, YOUNG GRAD KNOWS AN

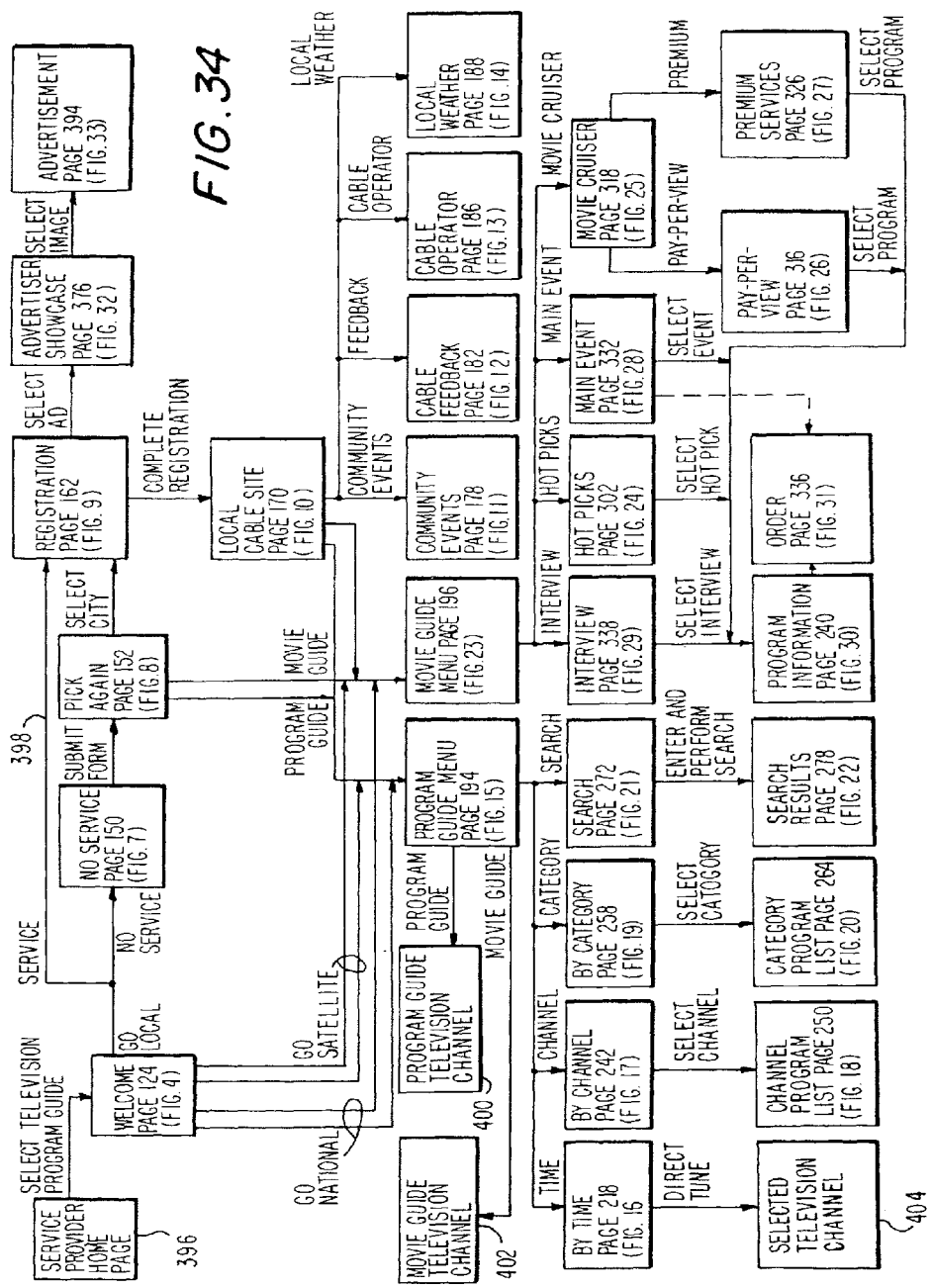

INTERNET TELEVISION PROGRAM GUIDE SYSTEM

This application is a continuation of U.S. patent application Ser. No. 11/894,621, filed Aug. 20, 2007, which is a continuation of U.S. patent application Ser. No. 11/486,948, filed Jul. 13, 2006 (now abandoned), which is a continuation of U.S. application Ser. No. 11/115,099, filed Apr. 26, 2005, which is a continuation of application Ser. No. 10/735,093, filed Dec. 12, 2003 (now abandoned), which is a continuation of U.S. application Ser. No. 10/287,640, filed Nov. 1, 2002 (now abandoned), which is a continuation of U.S. application Ser. No. 09/560,207, filed Apr. 27, 2000 (now abandoned), which is a continuation of U.S. patent application Ser. No. 08/938,028, filed Sep. 18, 1997 (now abandoned), which claims the benefit of United States provisional application No. 60/032,539, filed Dec. 10, 1996. All of these prior applications are hereby incorporated by reference in their entireties.

BACKGROUND OF THE INVENTION

This invention relates to the Internet, and more particularly, to techniques for providing television program guide information and services to a user over the Internet.

A large number of television channels are available over cable television systems and satellite television systems. Television viewers have traditionally had to consult preprinted television program listings to determine which programs were scheduled to be broadcast on a particular day. More recently, television-based program guides have been developed that allow television viewers to view television program listings directly on their television sets.

For example, the Prevue® channel is a scrolling television program listings service that a cable system operator may make available to subscribers over a dedicated cable channel. Viewers can tune to the appropriate television channel to view program listings for television programs that are currently being broadcast and are scheduled to be broadcast in the next few hours. Although the Prevue® channel is a valuable service, the viewer is somewhat constrained by the passive nature of the service. For example, the viewer cannot view television listings for the next day or week.

As a result, more advanced television program guide services have been developed that allow the service provider to deliver television program listing data to the user's set-top box. The data is typically delivered over the television cable system infrastructure (e.g., on a given television channel during the vertical blanking interval or over an out-of band channel.) Software in the set-top box allows the viewer to display the television, program listings on the viewer's television set.

These program guide services allow the user to manipulate the television listings by searching or sorting through the listings using criteria such as genre, channel, and broadcast time. An example of a such an interactive television program guide is the Prevue Express® guide of Prevue Networks, Inc. of Tulsa, Okla., the assignee of the present invention.

Although passive scrolling guides and interactive set-top box guides are useful sources of television program guide information, millions of users with personal computers have not been able to obtain on-line television program listings. In addition, users have not been able to select from diverse options that allow the user to view promotional video clips, interview segments, audio clips, and other multimedia material related to a given television program.

It is therefore an object of the present invention to provide a television program guide system that provides television program listings from a server to a user's multimedia system over an Internet communications link.

It is a further object of the present invention to provide a television program guide system that allows users to click on text or still images to view promotional video clips, audio clips, interview segments, and other multimedia material related to a given television program.

SUMMARY OF THE INVENTION

These and other objects of the invention are accomplished in accordance with the principles of the present invention by providing an Internet television program guide system. A computer system having a media library and a data server is used to provide multimedia clips and related television program guide data. The multimedia material and program guide data are provided to a web server. The web server provides this information to the user's multimedia system via an Internet communications link.

The multimedia system has a processing unit for receiving information from the Internet communications link and processing such information accordingly. The multimedia system also has a video unit for receiving television signals. In a first embodiment, the processing unit is based on a personal computer running a standard web browser with plug-ins. The video unit is based on a television. In a second embodiment, the processing unit and video unit of the multimedia system are provided by an integrated personal computer and television unit. In a third embodiment, the processing unit is in an Internet capable set-top box and the video unit is based on a television.

The web server may be located adjacent to the computer system and the program guide data and multimedia material provided to the multimedia system via the Internet. Alternatively, the web server may be located in a cable system headend. When the web server is located in the cable system headend, program guide data and other multimedia material may be provided to the web server via a satellite link. The program guide data and multimedia material are provided to the multimedia system over an Internet communications link.

Television program guide data and related multimedia information are preferably provided to the user's multimedia system in the form of one or more web pages. Because such an arrangement allows the use of the widely adopted hypertext transfer protocol (http) and emerging web standards, a user with a personal computer can access information using commonly available web browser software. Because program guide information is distributed over the Internet, the user can access this information at remote locations. For example, the user can access the television program guide service while traveling by car, bus, train, or plane, from a hotel room or business meeting, from a personal computer at work, or in any suitable environment in which there is a link to the Internet. In all arrangements (whether the user is accessing the program guide service from their home or from a remote location), the system benefits from using the established protocols and standards of the Internet.

In addition, because the Internet television program guide is provided as a web site having a number of linked web pages, features can be easily added or deleted from the service by the service provider, without directly affecting the hardware and software of the user.

Using a web site platform also allows a wide range of service options to be provided. In particular, numerous media formats (animation, full motion video, sound, still images, and text) are supported and may be interconnected using various embedded hypertext transfer protocol links.

Further features of the invention, its nature and various advantages will be more apparent from the accompanying drawings and the following detailed description of the preferred embodiments.

BRIEF DESCRIPTION OF THE DRAWINGS

FIG. 6 is a diagram of a map-based menu for a smaller geographical region than shown in FIG. 5.

FIG. 7 is a web page informing the user that no service is available.

FIG. 9 is a web page allowing the user to provide information regarding the user's multimedia system to the service provider.

FIG. 18 is a web page containing television program guide listings organized by channel.

FIG. 20 is a web page containing television program guide listings organized by category.

FIG. 21 is a search page containing a box for entering search text and various search field options.

FIG. 22 is a television program guide listing page based on the results of a search.

FIG. 23. is a web page presenting program guide options related to promotional clips, interview segments, and pay-per-view and premium services.

FIG. 24 is a web page presenting various image stills that may be selected by the user when it is desired to view related video clips.

FIG. 26 is a web page containing television program listings for a selected pay-per-view channel.

FIG. 27 is a web page containing television program listings for a selected premium channel.

FIG. 28 is a web page providing information regarding upcoming pay-per-view sporting and special events.

FIG. 33 is a web page containing detailed advertising information on a selected topic or television program.

FIG. 34 is a site map showing the options that are selected and the links that are traversed in navigating among the television program guide web pages of FIGS. 4-33.

DETAILED DESCRIPTION OF THE PREFERRED EMBODIMENTS

Figure 1:
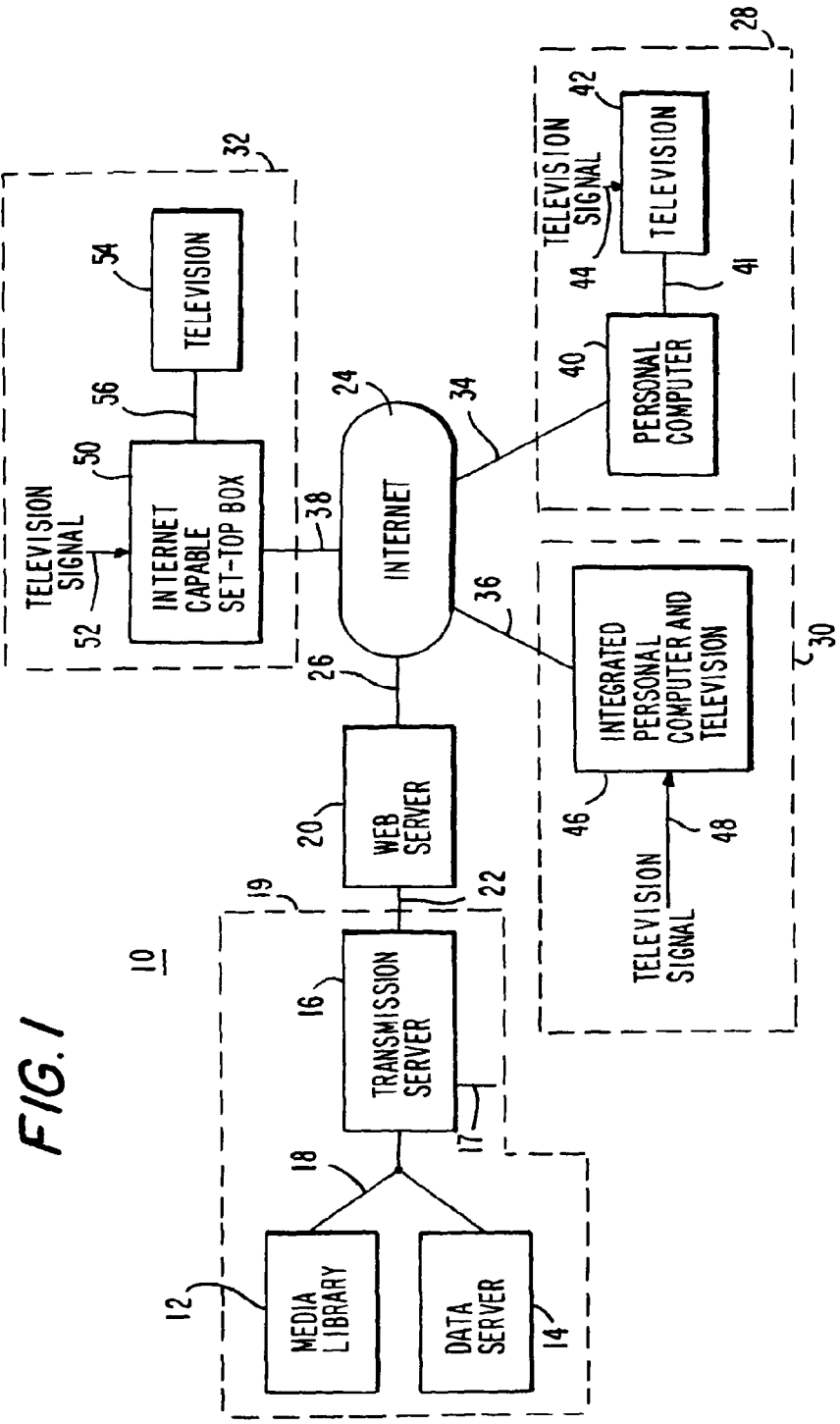
FIG. 1 is a system diagram showing a media library and data server interconnected with a web server and various multimedia systems.

An Internet television program guide system 10 is shown in FIG. 1. Television program information is stored in media library 12 and data server 14. Media library 12 preferably contains an array of compact disc read only memory (CD-ROM) disks, digital video disks (DVDs), or other suitable media for storing multimedia content. Media library 12 contains television program clips and related interviews and reviews. The television program information stored in media library 12 is primarily video-based. Data server 14 maintains various databases of television program information. For example, data server 14 may have a remote media database containing descriptions of videos in media library 12. Data server 14 may also have a database containing information on standard titles, a pay per view database containing information regarding pay-per-view events, and a scheduling information database. Data server 14 may have a cable system operator database containing channel lineups, information on the time zone of the operator, weather data for the operator's region, data on the zip codes in the cable system operator's area, etc. Other databases may be supported by data server 14, as desired. The television program information in data, server 14 is primarily in non-video formats.

Media library 12 and data server 14 are interconnected with transmission server 16 via internal network 18. Media library 12, data server 14, network 18, and transmission server 16 make up computer system 19. Television program information may be stored on data server 14 in a relational database format and may be stored on transmission server 16 in an object-oriented database format. A building process implemented in the C** programming language can be used to periodically (e.g., once a day) build a temporary data set of television program information (e.g., a seven-day to one-month data set) for storage on transmission server 16. Transmission server 16 also receives information for the Internet television program guide service such as weather data, sports scores, etc., via data input 17.

Television program information and related data may be transferred from transmission server 16 to web server 20 via communications line 22. Communications line 22 may be part of an internal network or may be a standard dedicated communications line. Web server 20 can be connected to the Internet 24 via communications link 26. Communications link 26 is preferably a telephone line or other suitable Internet communications path.

If transmission server 16 and web server 20 are separate devices, as shown in FIG. 1, transmission server 16 can be used as a common data processing facility for other applications which use the type of television program data stored on transmission server 16. If desired, the functions of transmission server 16 and web server 20 can be integrated in a signal machine.

Web server 20 uses a standard protocols such as the TCP/IP (Transmission Control Protocol/Internet Protocol) and hypertext transfer protocol to make the television program information available over the Internet 24 to users at multimedia systems 28, 30, and 32 via communications links 34, 36, and 38. Communications links 34, 36, and 38 are Internet links formed from telephone lines, radio-frequency (RF) links, cable modem links, satellite dish links, combinations of links such as these, or any other suitable internet connection paths.

Multimedia system 28 has personal computer 40 and may have television 42. Certain program guide features require that personal computer 40 be able to control television 42 via link 41, which may be, e.g., an infrared communications link. Link 41 allows, personal computer 40 to tune television 42 using control signals. Television 42 receives television signals from input 44. The television signals received by input 44 and the other television signal inputs shown in FIGS. 1-3 may be provided by cable television, satellite television, broadcast television, a combination of such sources, or any other suitable source of television programming signals. Internet access for multimedia system 28 is provided via Internet communications link 34.

Multimedia system 30 has an integrated personal computer and television 46, such as the Gateway 2000 Destination® PC-TV hybrid available from Gateway 2000 Inc. of North Sioux City, S.Dak. Television signals are provided at input 48. Internet access is provided via Internet communications link 36.

Multimedia system 32 has an Internet capable set-top box 50. Set-top box 50 may use the TV OnLine® set-top box application software of World Gate Corporation, which may be implemented on set-top boxes such as the CFT-2200® of General Instrument Corporation of Hatboro, Pa. and the 8600x® of Scientific Atlanta of Atlanta, Ga. Set-top box 50 receives television signals via input 52. Internet access is provided via Internet communications link 38. Video display signals containing television and Internet information are provided to television 54 by line 56.

During operation of system 10, certain data processing functions, such as user-initiated searches and sorts, are typically performed on web server 20. If desired, such functions can be performed on a suitable data processing component in multimedia systems 28, 30, and 32.

Figure 2:
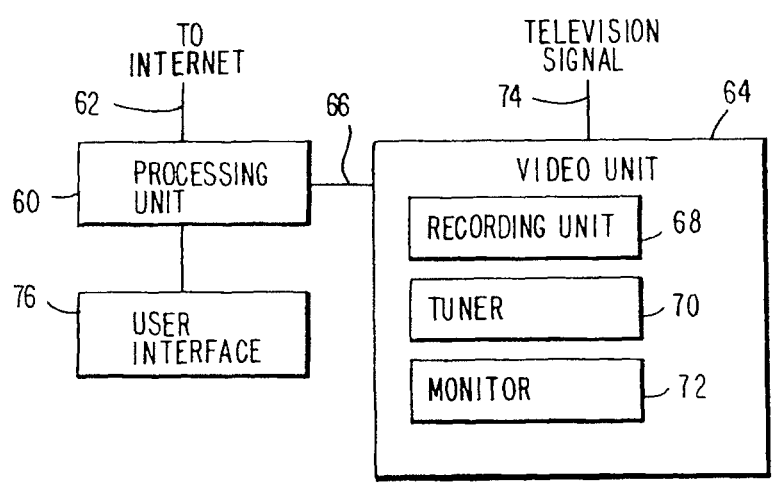
FIG. 2 is a generalized diagram of a user's multimedia system.

Certain television guide functions require only that multimedia systems 28, 30, and 32 contain web browsing capabilities. Other functions require television tuning and video recording capabilities. FIG. 2 shows a generalized multimedia system arrangement that is capable of supporting controlled television tuning and video recording, if desired. As shown in FIG. 2, multimedia system 58 has a processing unit 60, which preferably contains memory for storing instructions and a microprocessor for executing the instructions. Processing unit 60 accesses the Internet via Internet link 62. Video unit 64, which may be connected to processing unit 60 by communications line 66, contains recording unit 68, tuner 70, and monitor 72. Television signals are received at input 74.

Tuner 70 is used to select television programs from television signals on input 74 for viewing or recording. Tuner 70 may be controlled under the direction of control signals provided by processing unit 60 over communications link 66. Television signals and Internet information can be viewed using monitor 72. Recording unit 68 allows the user to make videocassette recordings of television programs. Recording unit 68 may also be controlled by control signals from processing unit 60.

The operation of processing unit 60 is determined based on the execution of instructions stored in memory in processing unit 60 and on control inputs received from the user via user interface 76. Suitable user interfaces include handheld infrared remote controls, keyboards, pointing devices, and voice recognition devices.

Multimedia systems, such as multimedia system 58 of FIG. 2 may be used in place of multimedia systems 28, 30, and 32. Alternatively, systems such as systems 28, 30, and 32 may be modified to incorporate features like those shown multimedia system 58. For example, if it were desired to provide a multimedia system with circuitry to handle video recording, video recording units (such as recording unit 68) could be provided in systems such as multimedia systems 28, 30, and 32. In addition, in systems such as system 58, certain components may be used more than once (e.g., tuner 70 may be contained within both a television component and a videocassette recorder component in system 58).

Regardless of the specific configuration of the multimedia systems used in system 10, the user of such a multimedia system has the capability to access television program guide information on web server 20. Many of the features of the Internet program guide service are available using multimedia systems with the capabilities of a modern personal computer (desktop or laptop). If it is desired to use certain program guide features that rely upon controlling a tuner or recording unit, the multimedia system should also have the ability to tune to a desired television program from among the various television programs provided at inputs 44, 48, 52, and 74 and have the ability to record that program automatically, under the control of commands from processing unit 60. Additional features may also be implemented on multimedia system 58.

Figure 3:
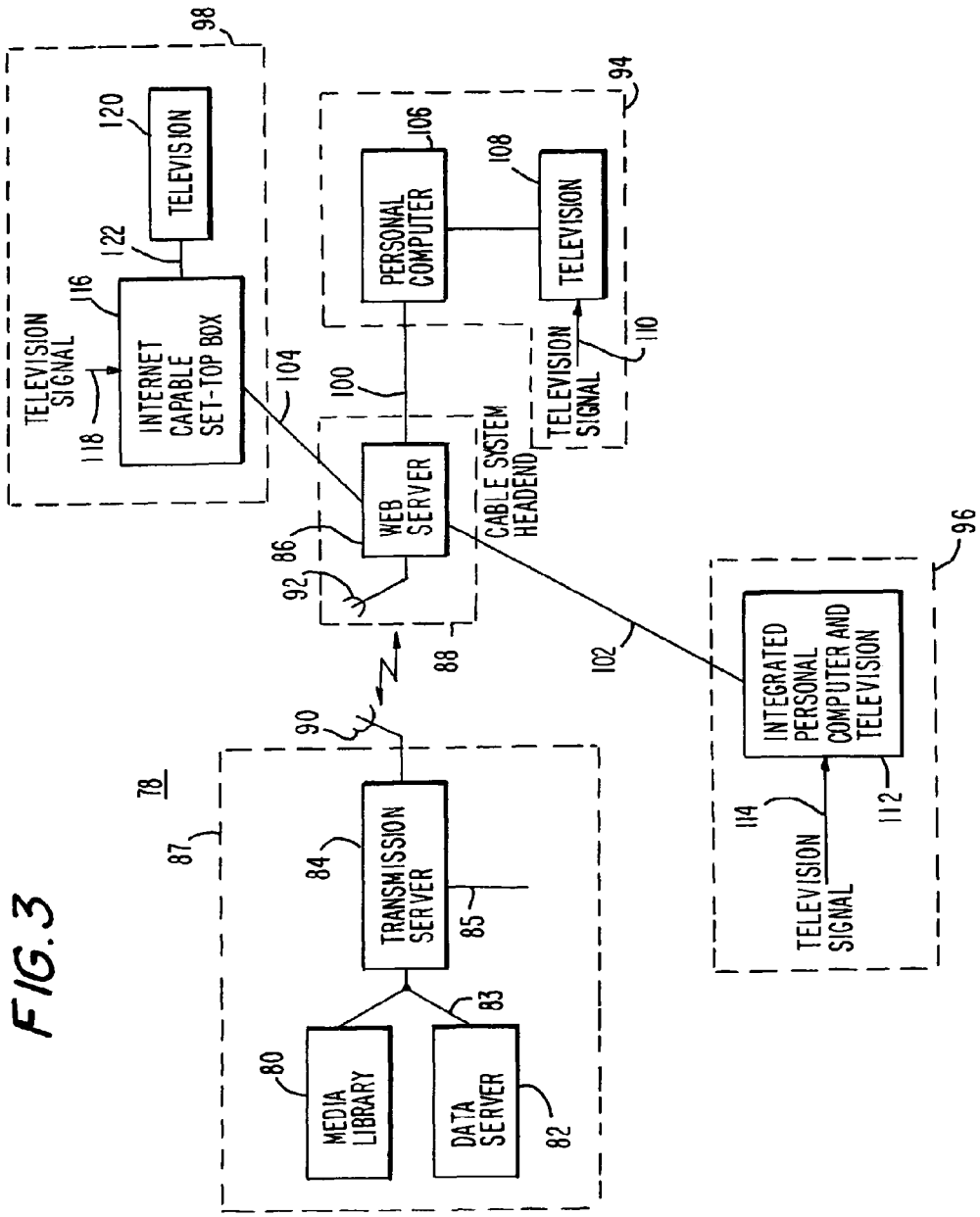
FIG. 3 is a system diagram similar to that of FIG. 1 showing an arrangement in which the web server is located in a cable system headend.

Another configuration that may be used for an Internet television program guide system is shown in FIG. 3. As shown in FIG. 3, Internet television program guide system has media library 80 and data server 82. Media library 80 contains television program clips, interviews, and reviews. The television program information stored in media library 80 is primarily video. Data server 82 contains databases of television program information. For example, data server 82 may have a database containing descriptions of videos in media library 80. Data server 82 may also have a databases containing information on program titles, pay-per-view events, and television program schedules. Data server 82 may have a cable system operator database containing channel lineups, information on the time zone of the operator, weather data for the operator's region, data on the zip codes in the cable system operator's area, etc. Other databases may also be supported by data server 82. The television program information in data server 82 is mainly in formats other than video.

Media library 80 and data server 82 are interconnected with transmission server 84 via internal network 83. Media library 80, data server 82, and internal network 83 make up computer system 87. Television program information may be stored on data server 82 in a relational database format and may be stored on transmission server 84 in an object-oriented database format. A building process implemented in the C programming language may be used to periodically (e.g., once a day) build a temporary data set of television, program information (e.g., a seven-day to one-month data set) for storage on transmission server 84. Transmission server 84** also receives information for the Internet television program guide service such as weather data, sports scores, etc., via data input 85.

A web server 86 is provided in each cable system headend 88. Cable system headend 88 has additional components (not shown) for distributing cable television signals to customers in the service area surrounding headend 88. Providing web server 86 in a location that is relatively close to users allows television program information to be provided to the users efficiently.

Television program information (including video clips and associated television program data) is transmitted from transmission server 84 to each cable system headend 88 via satellite uplink 90 and satellite downlink 92. Each web server 86 uses the Internet TCP/IP protocol to make the television program information available to users at multimedia systems 94, 96, and 98 via respective communications links 100, 102, and 104. Communications links 100, 102, and 104 are Internet links formed from telephone lines, radio-frequency (RF) links, cable modem links, satellite dish downlinks, combinations of links such as these, or any other suitable Internet connection paths. Although illustrated as direct links between multimedia systems 94, 96, and 98 and web server 86, communications links 100, 102, and 104 may be Internet paths that pass through extensive portions of the Internet.

Multimedia system 94 has personal computer 106 and may have television 108. Television 108 receives television signals from input 110. Access to web server 86 is provided via Internet communications link 100.

Multimedia system 96 has an integrated personal computer and television 112, such as the Gateway 2000 Destination PC-TV hybrid. Television signals are provided at input 114. Access to web server 86 is provided via Internet communications link 102.

Multimedia system 98 has an Internet capable set-top box 116, such as the TV OnLine® set-top box. Set-top box 116 receives television signals via input 118. Access to web server 86 is provided via Internet communications link 104. Video display signals containing television and Internet information are provided to television 120 by line 122.

The system hardware shown in FIGS. 1-3 for providing television program guide Internet services is illustrative and other suitable hardware arrangements may be used, if desired. Regardless of the particular hardware system that is used, however, the present invention preferably involves providing television program guide services and features to users over the Internet in the form of multiple, web pages that use the standard hypertext transfer protocol (http). In the system of FIG. 1, web pages and associated program guide features (such as searching, etc.) are provided using web server 20. In the system of FIG. 3, web pages and associated features are provided using web server 86.

Because television program guide services are provided using web pages, the program guide services may be accessed using standard web browsers operating on the appropriate processing unit in the user's multimedia system. For example, in multimedia system 58 of FIG. 2, a web browser may be implemented using processing unit 60. Suitable web browsers include the Internet Explorer® web browser of Microsoft Corporation of Redmond, Wash. and the Netscape Navigator® web browser of Netscape Communications Corporation of Mountain View, Calif. Such web browsers support the viewing of various types of multimedia content, such as video stills (JPEG or GIF files) and video and audio clips (AVI, MOV, and MPG files). If desired, certain of these multimedia support functions may be provided as web browser plug-ins (i.e., special software modules designed to enhance the features of a web browser application). A suitable video player plug-in for MOV files is the Quicktime® application of Apple Computer, Inc. of Cupertino, Calif. AVI and MPG (or MPEG—Motion Picture Expert Group) files may be played using the ActiveMovie® application of Microsoft Corporation.

Figure 4:
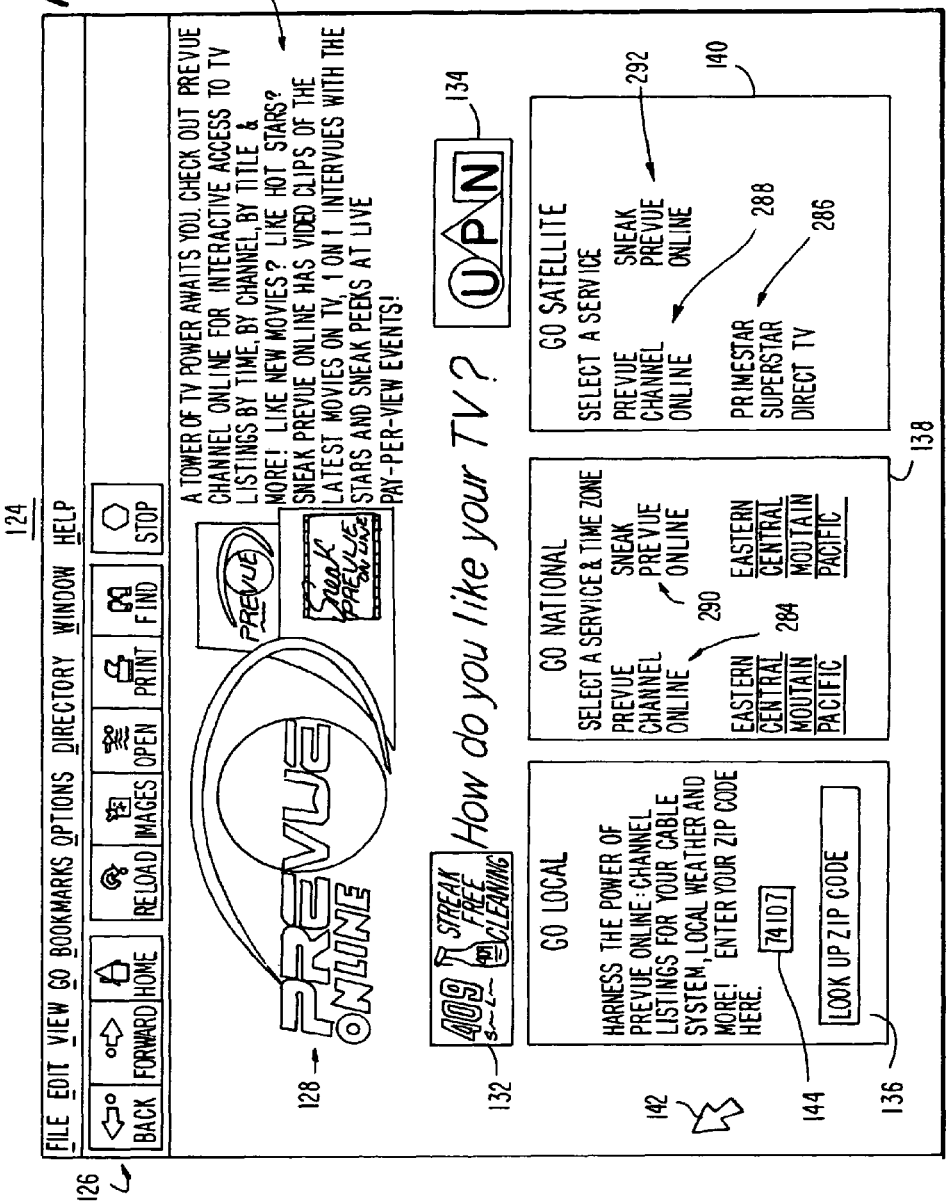
FIG. 4 is a diagram of a home page for an Internet television program guide.

An illustrative welcome page 124 for the television program guide service of the present invention is shown in FIG. 4. (A site map is shown in FIG. 34.) Web browser function keys 126 help the user at multimedia system 58 to navigate through web pages of material such as welcome page 124. Users may also navigate by clicking on an image or an element of highlighted text with cursor 142, which may be controlled by a pointing device such as a mouse or trackball. Other arrangements for selecting links may be used if supported by the user interface 76 that is provided in multimedia system 58. Web browser function keys 126 include back and forward keys that allow the user to navigate backward and forward along a browsing trail. Web browser function keys 126 are not shown in the other FIGS., but are shown in FIG. 4 to illustrate the types of function keys that are available with a standard web browser.

Welcome page 124 may contain identifying logos 128 (which may be, for example, United States trademarks). Identifying logos 128 allow a user to quickly associate a service provider, such as the assignee of the present invention, Prevue Networks, Inc. of Tulsa, Okla., with the Internet television program guide service. If desired, welcome page 124 can contain summary instructions 130 that inform the user of some of the features available with the service. Other web pages (not shown) may contain links that point to welcome page 124.

Advertisements 132 and 134 allow a service provider to generate revenues from parties who wish to advertise products using Internet television program guide system 10 (FIG. 1) or 78 (FIG. 3).

Advertisements 132 and 134 may be video stills, may be animated, or may include full-motion video. Audio material can also be associated with advertisements 132 and 134. For example, supplemental audio information can be provided when a user clicks on advertisement 132 or 134. If desired, advertisements 132 and 134 may be linked to web sites provided by the advertising parties. The advertisements 132 and 134 that are displayed may periodically (e.g., once every few seconds) cycle through different advertisements for different advertisers.

An important aspect of the Internet television program guide service provided by system 10 (FIG. 1) and system 78 (FIG. 3) relates to on-line television program listings and information on upcoming movies and special events. The user may be presented with a number of choices regarding the type of on-line information that is available. For example, the user may be presented with the opportunity to select between go local option 136, go national option 138, and go satellite option 140. Additional features of the service may be accessed after the user has selected one of these options.

Figure 5:
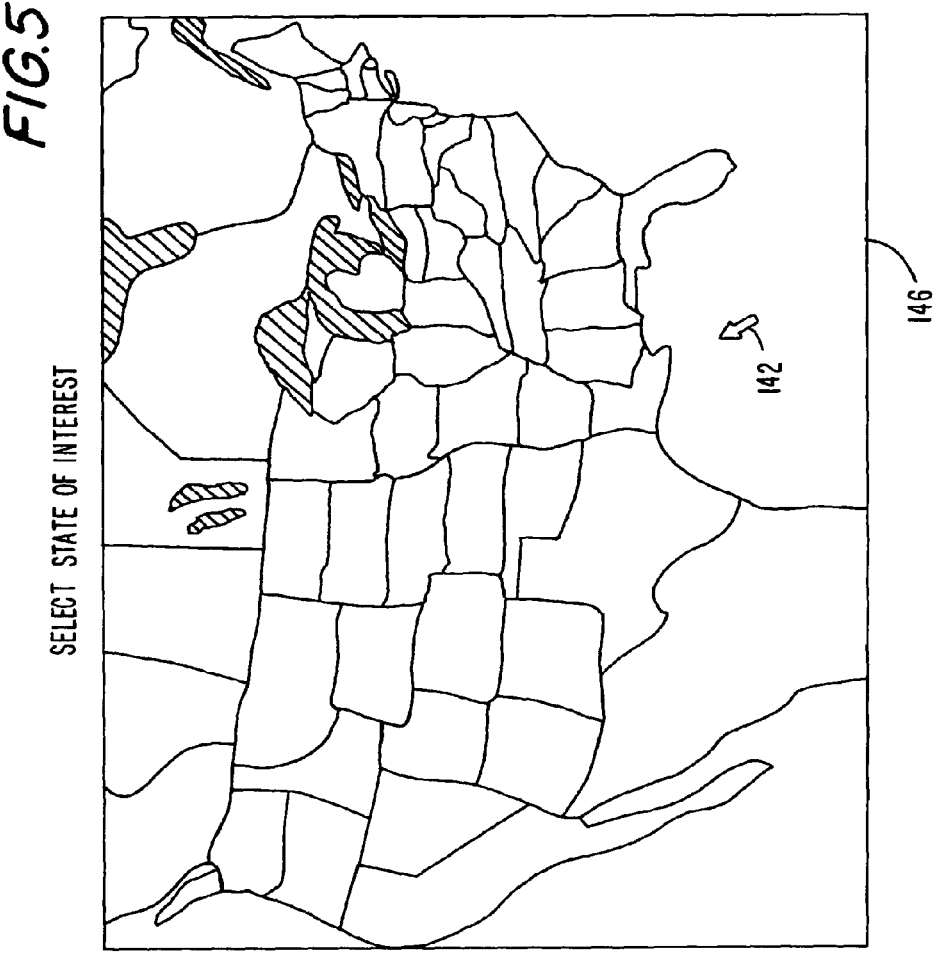
FIG. 5 is a diagram of a map-based menu for identifying a geographical area of interest.

If the user desires to select go local option 136, the user may be prompted to enter a zip code for the local area of interest in box 144. If service is available, the program guide system links the user to an appropriate the local system operator's web site based on the zip code information. If desired, the user can select a local area by entering information such as a cable system operator's name, the name of a city, international country and city information, etc. Another way in which the user may select a local service area of interest is using a map-based graphical user interface. As shown in FIG. 5, the user is presented with United States map 146. The user selects a state of interest using cursor 142. If necessary, additional maps containing greater levels of detail are provided, each allowing the user to make further geographical selections. Ultimately, the user is presented with a local map (e.g., a map that allows the user to select from several available cable system operators). In map 148 of FIG. 6, the user can select between three available cable system operator regions: region 1, region 2, and region 3.

If no local service is available, the user may be provided with a web page such as no service page 150 of FIG. 7, in which the user is informed that local service is not presently available in the area selected by the user. No service page 150 may provide the user with an opportunity to submit the user's e-mail address, cable provider information, local zip code information, and comments. Information provided by the user can be used by the operator of the television program guide system to solicit participation from non-participating local cable operators.

Figure 8:
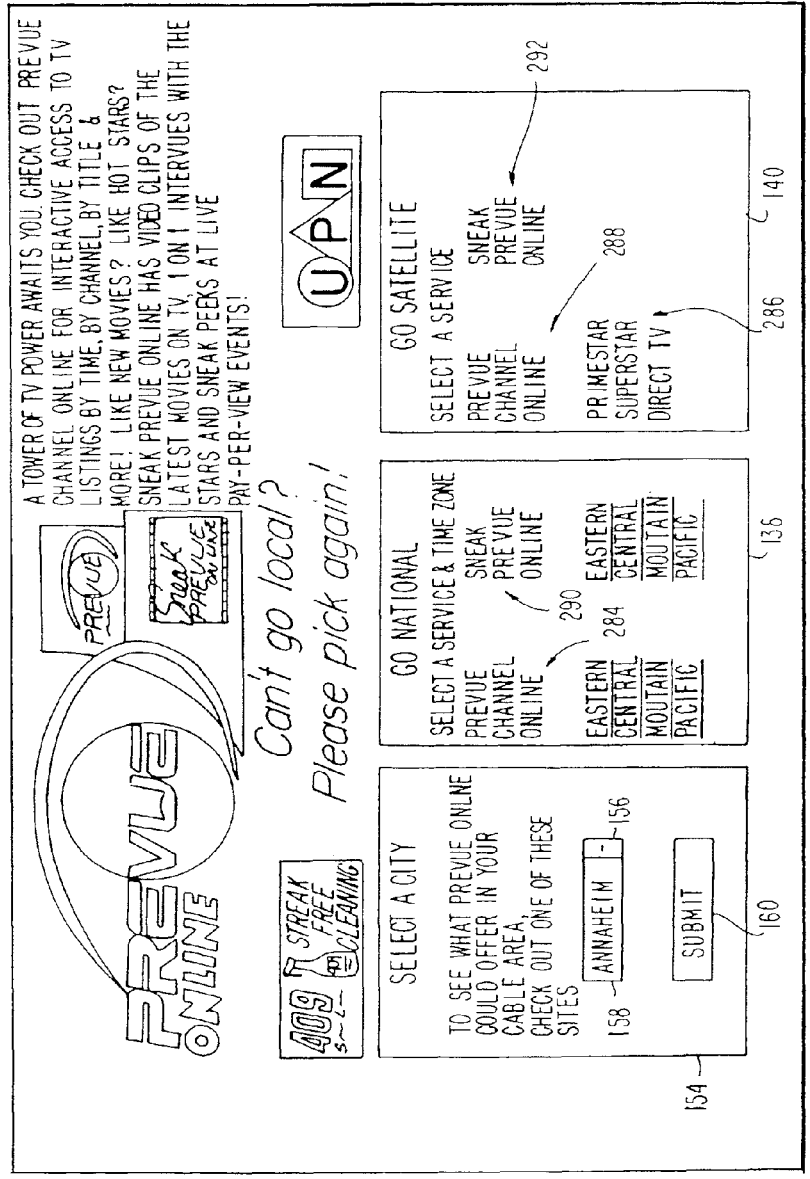
FIG. 8 is a web page offering alternatives to local service.

If no local service is available, the user may also be provided with pick again page 152, as shown in FIG. 8. Pick again page 152 provides the user with another opportunity to select go national option 138 or go satellite option 140. In addition, pick again page 152 provides the user with select a city option 154, which is associated with a less restrictive set of program information than go local option 136 (FIG. 4). With select a city option 154, the user may select a desired city using arrow key 156 (or alternatively, could type the name of the city directly into box 158). After entering the desired city, the city information is submitted to the system by clicking on submit button 160. Because select a city option 154 is less localized than go local option 136, choosing select a city option 154 makes it more likely that there will be a set of program listings available for the user.

If service is available for the user in either the city selected in city option 154 or the localized geographic area selected in go local option 136, the user is presented with registration page 162, as shown in FIG. 9. Registration page 162 may contain instructions prompting the user to enter an e-mail address and information concerning the user's, computer equipment. As with many of the other web pages provided in connection with the Internet television program, guide service of systems 10 (FIG. 1) and 78 (FIG. 3), registration page 162 contains an identifying logo 164 and advertisements 166 and 168.

Figure 10:
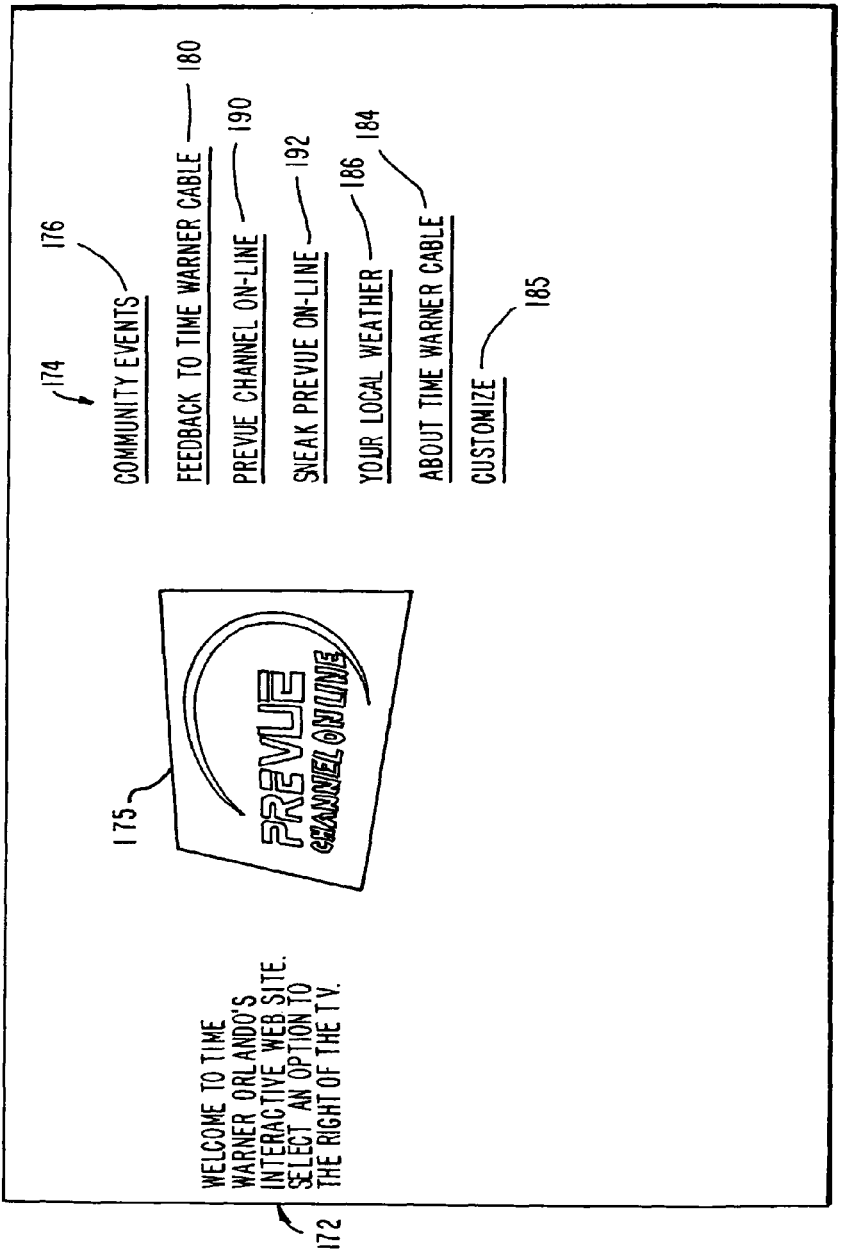
FIG. 10 is a web page presenting various program guide options to the user.

Upon completing registration page 162, the user is presented with local cable site page 170 of FIG. 10, which is customized to reflect the local geographic area or city selected by the user. Local cable site page 170 may contain a welcome message 172 that is customized to reflect the name of the local cable system operator.

A number of options 174 may be presented as hypertext links to associated web pages. An image 175 is displayed that changes as the user places cursor 142 on top of each option 174. For example, the image 175 of FIG. 10 is presented when the user positions cursor 142 over program guide option 190. Different images are displayed as cursor 142 passes over each option 174. The images 175 to be displayed are stored as bitmap images in processing unit 60 of multimedia system 58 (FIG. 2). This technique of presenting context-sensitive images to illustrate the current position of the cursor over hypertext link options is preferably used throughout the Internet television program guide service.

Figure 11:
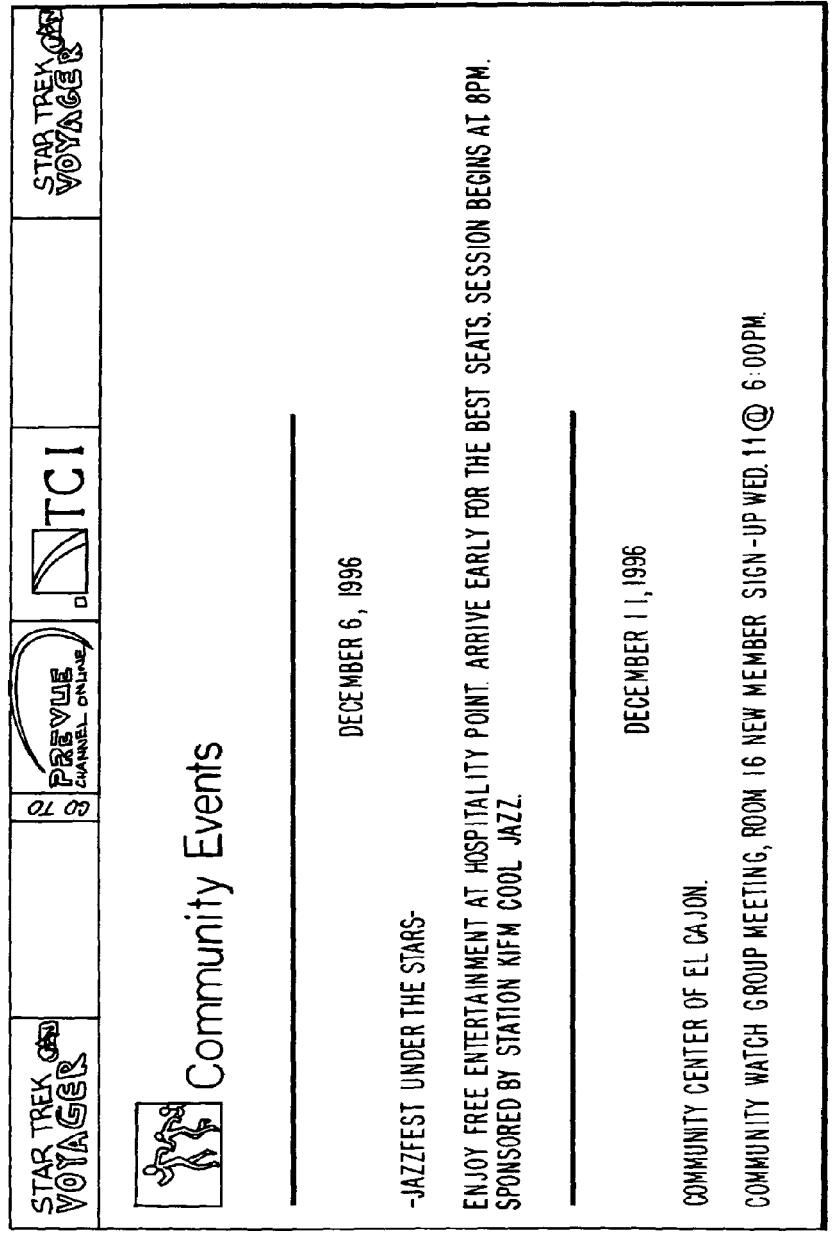
FIG. 11 is a web page containing information on community events.

Various web pages may be displayed depending on which option 174 is selected by the user. For example, selecting community events option 176 presents the user with community events page 178 (FIG. 11), which contains information on local upcoming community events. If desired, the listed community events may be specific to the type of service to which the user subscribes (e.g., cable or satellite).

Figure 12:
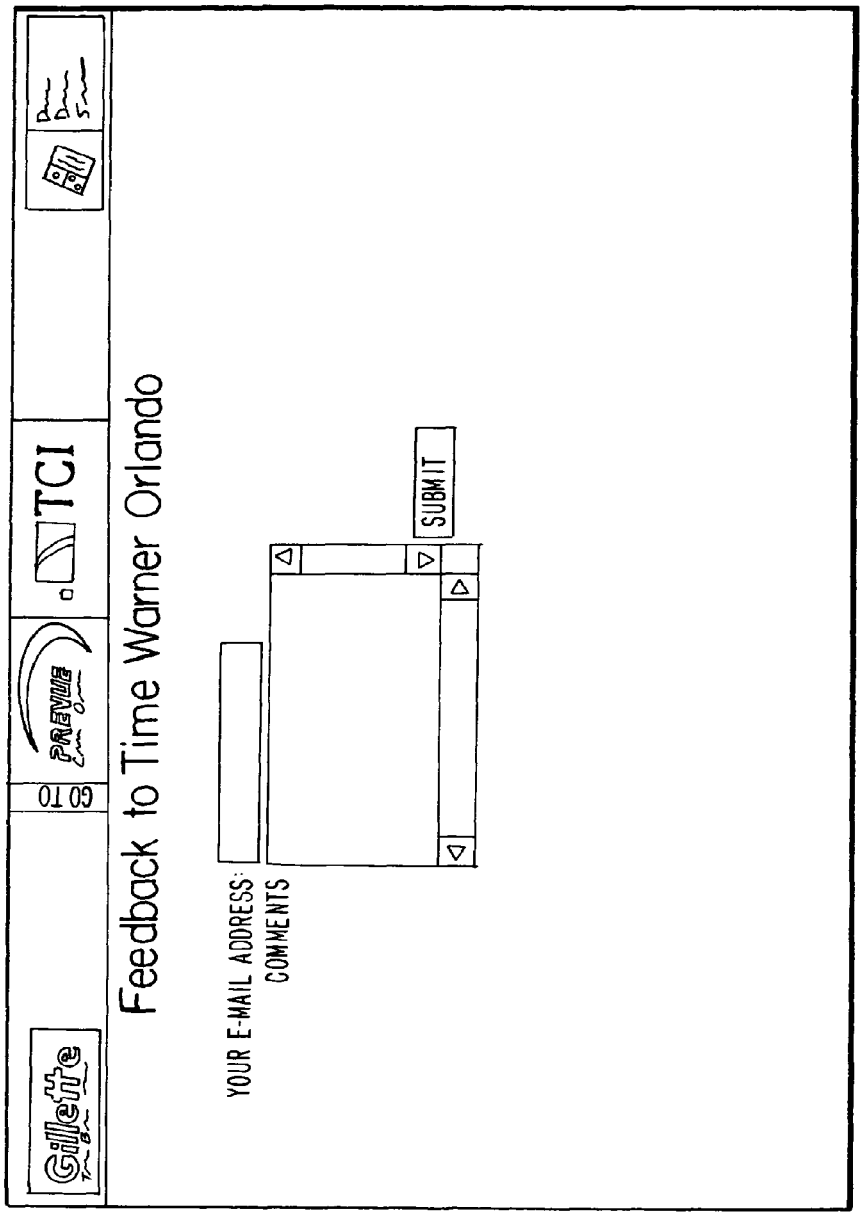
FIG. 12 is a web page providing the user an opportunity to give feedback to a local cable system operator.

Selecting cable feedback option 180 presents the user with cable feedback page 182 (FIG. 12), which allows the user to submit an e-mail address and comments to the local cable system operator.

Figure 13:
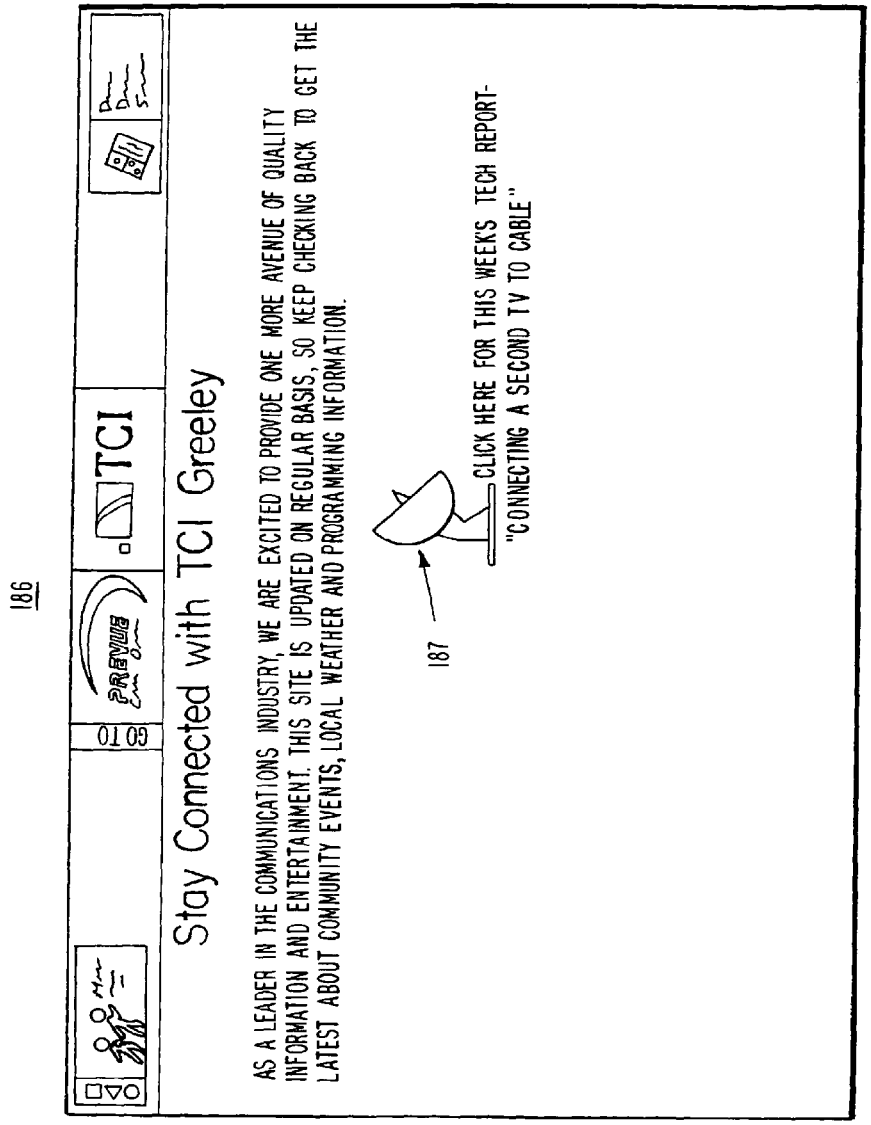
FIG. 13 is a web page containing information pertaining to the local cable operator's system.

Selecting cable operator option 184 takes the user to cable operator page 186 (FIG. 13), which contains information related to the local cable system. For example, by clicking on icon 187, the user may be provided with a weekly report prepared by the cable system operator.

Figure 16:
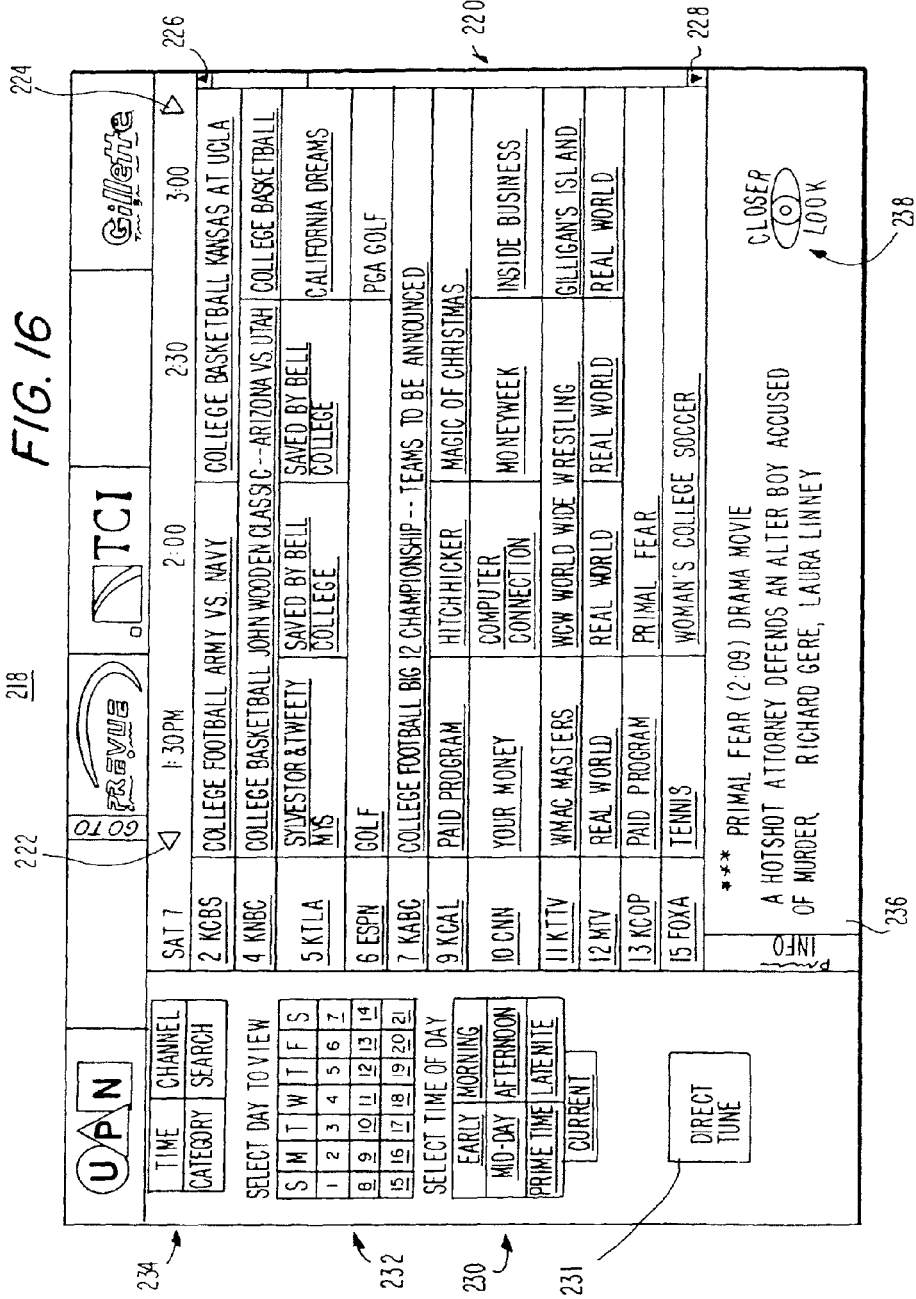
FIG. 16 is a web page containing television program guide listings organized by time.

If the user wishes to customize the program guide service, the user may click on customize option 185 (FIG. 10). Selecting customize option 185 presents the user with a customization web page containing guide features that the user can customize, such as channel line-ups and genre-specific display colors (e.g., pink for sports program listings and orange for movie program listings). The customization web page may also contain user-selectable options that control how the user receives reminder messages when a desired program is about to start on the user's television. The user can direct the system to provide a pop-up reminder on the television screen, to send the user an e-mail reminder, or to remind the user via a predetermined paging number, etc. Customize option 185 may be provided in any. suitable portion of the program guide service, such as on a program guide listings page (FIG. 16).

Figure 14:
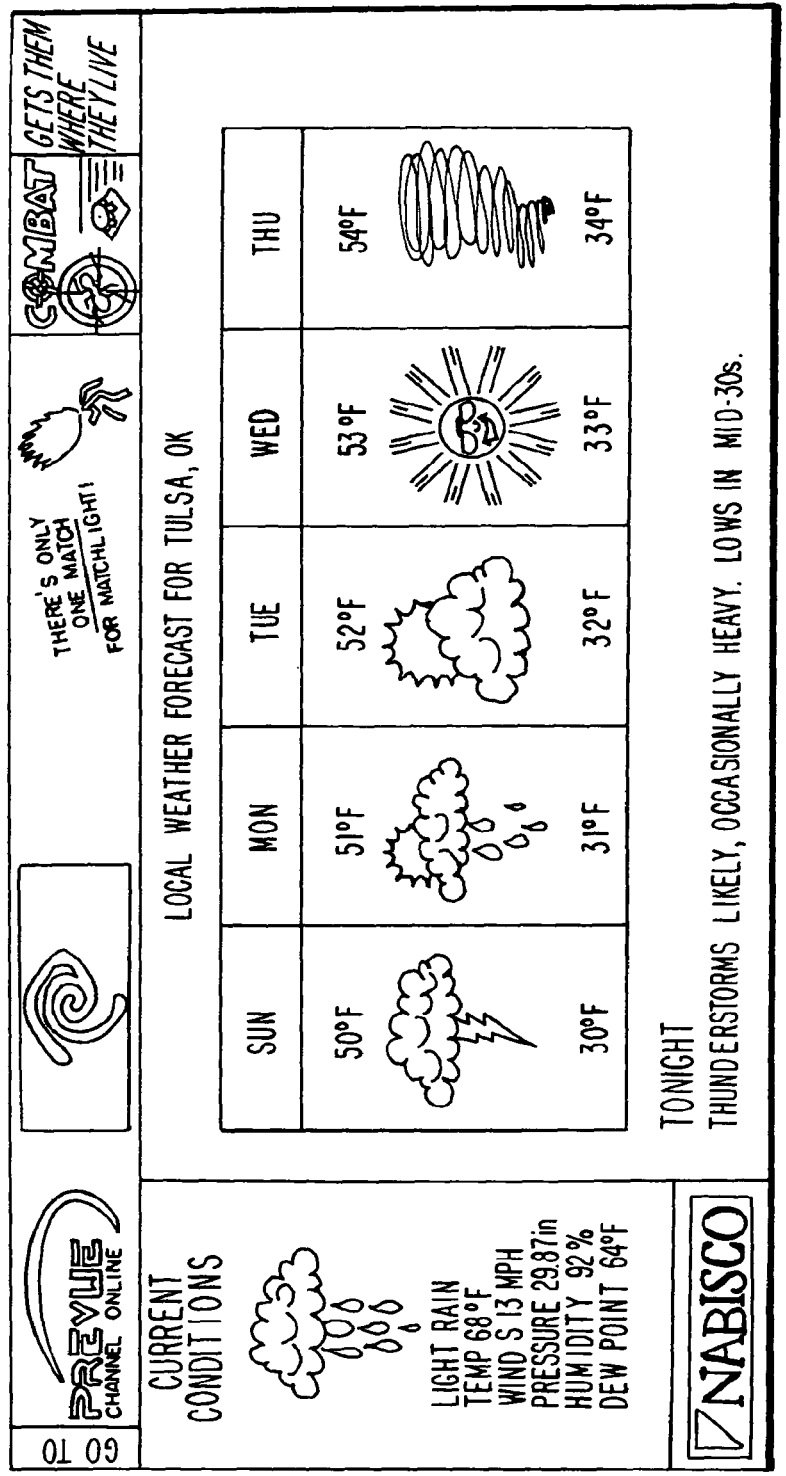
FIG. 14 is a web page containing weather information.

Another option 174 that is available on local cable site page 170 (FIG. 10) is local weather option 186. Selecting local weather option 186 takes the user to local weather page 188 (FIG. 14). If desired, a map-based menu (such as shown in FIGS. 5 and 6) or other user input arrangement can be used to provide the user with the opportunity to select additional cities for which weather information is desired.

Figure 15:
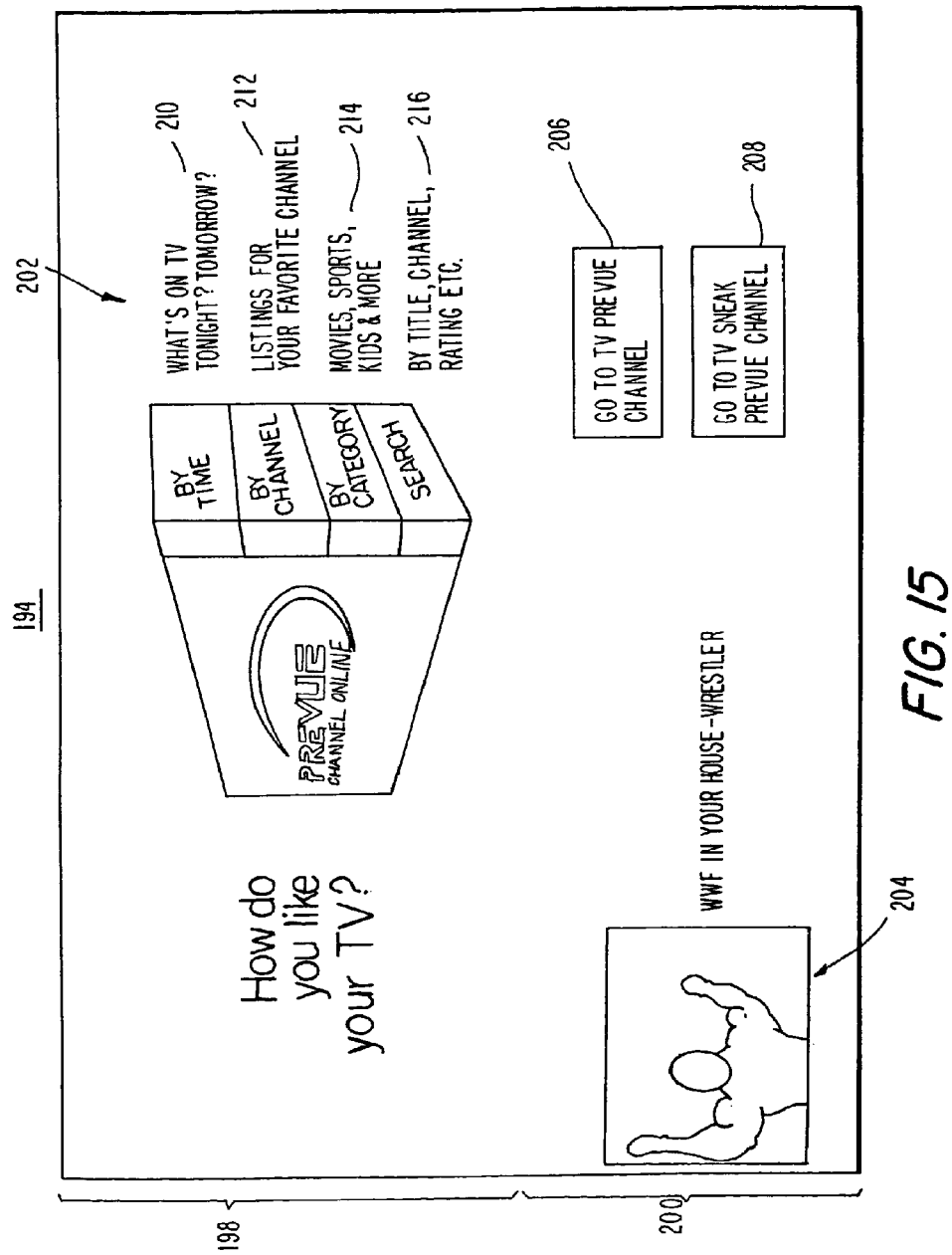
FIG. 15 is a web page presenting various program guide options including direct links to related program guide and movie guide television channels.

Program guide option 190 allows the user to access television program listings that can be organized by time, channel, and category and can be searched. Selecting program guide option 190 takes the user to program guide menu page 194 (FIG. 15). Movie guide option 192 allows the user to access channel listings for premium and pay-per-view channels, interviews, and various promotional media. Selecting movie guide option 192 takes the user to movie guide menu page 196 (FIG. 23).

The user may reach program guide menu page 194 (FIG. 15) from go national option 138 (FIGS. 4 and 8) or go satellite option 140 (FIGS. 4 and 8). If the user selected go local option 136 (FIG. 4) and successfully completed registration page 162 (FIG. 9), the user may reach program guide menu page 194 (FIG. 15) by selecting program guide option 190 on local cable site page 170 (FIG. 10). The user may also reach program guide menu page 194 (FIG. 15) via select a city option 154. Each of these paths to program guide menu page 194 requires that slightly different user selections be made.

Go local option 136 (FIG. 4) requires that a user specify a particular local region (or cable system operator) of interest to reach local cable site page 170 (FIG. 10). To reach program guide menu page 194 (FIG. 15) from local cable site page 170, the user selects program guide option 190.

Go national option 138 (FIGS. 4 and 8) requires that a user select a desired time zone (e.g., eastern, central, mountain, or pacific). To reach program guide menu page 194 from welcome page 124 (FIG. 4) or pick again page 152 (FIG. 8), the user selects program guide option 284.

Go satellite option 140 (FIGS. 4 and 8) requires that the user select a desired satellite provider 286. To reach program guide menu page 194 from welcome page 124 (FIG. 4) or pick again page 152 (FIG. 8), the user selects program guide option 288.

Select a city option 154 (FIG. 8) requires that the user enter information specifying a particular city. When the user submits the city information by clicking on submit button 160, the user is taken to registration page 162 (FIG. 9). The user reaches program guide menu page 194 from local cable site page 170 (FIG. 10) after completing the form on registration page 162.

Regardless of which option is used to reach program guide menu page 194 (FIG. 15), information is preferably retained by the system 10 or 78 that indicates which selections have been made by the user. Retaining this information allows subsequently displayed program listings and other information to be automatically customized to reflect the user's selections.

As shown in FIG. 15, program guide menu page 194 may be constructed from two smaller web pages: top web page 198 and a bottom web page 200. Top web page 198 contains graphics and text-based options 202 that are common to many different system operators. Bottom web page 200 may contain system specific promotional materials, such as pay-per-view video promotion 204. Dividing program guide menu page 194 in this way allows system resources to be used more efficiently than would otherwise be possible, because the common material in top web page 198 can be used for more than one local cable system.

If desired, television channel options 206 and 208 may be provided that allow the user to easily access related television channel program services. When the user selects options 206 or 208, processing unit 60 (FIG. 2) sends control commands to video unit 68 that direct tuner 70 of video unit 64 to tune to a television channel on which the desired program service is being broadcast.

For example, if the user wishes to tune video unit 64 to the Prevue® channel, the user may click on program guide television channel option 206. When program guide television channel option 206 is selected, processing unit 60 directs video unit 64 to select the appropriate television signal from television signal input 74 so that the Prevue® channel is displayed on monitor 72. The Prevue® channel is an example of a type of program guide service that displays a scrolling list of television program titles with a concurrent display of promotional videos and advertisements.

If the user wishes to tune video unit 64 to the Sneak Prevue® channel, the user may click on movie guide television channel option 208. When movie guide television channel option 208 is selected, processing unit 60 directs video unit 64 to select the appropriate television signal from television signal input 74 so that the Sneak Prevue® channel is displayed on monitor 72. The Sneak Prevue® channel is an example of a type of movie guide service that displays promotional videos of upcoming pay-per-view events and premium channel offerings.

Television channel options 206 and 208 allow user to jump directly from an Internet-based television program guide service to related program guides services provided on conventional television channels. Facilitating this type of direct link is beneficial for the user, because it allows the user to avoid the cumbersome steps of leaving the Internet-based service and manually tuning video unit 64 to the appropriate channel while attempting to remember the correct channel number of the desired television service.

Options 202 allow the user to choose how to display various program listings for the user's preselected region of interest (national, satellite, or local). Typical options 202 include by time option 210, by channel option 212, by category option 214, and search option 216.

If by time option 210 is selected, the user is presented with by time page 218, as shown in FIG. 16. By time page 218 contains program listings 220 that are organized in channel order from top to bottom and by broadcast time from left to right. In by time page 218, the programs in program listings 220 may be listed beginning with programs that are currently being broadcast. For example, if the current time is between 1:30 PM and 2:00 PM, program listings 220 may begin with programs that start at 1:30 PM. Alternatively, the programs in program listings 220 may be listed based on a predetermined time slot (e.g., morning, afternoon, or prime time). If desired, the closest time slot to the current time may be displayed. Program listings 220 typically contain information for about two hours of programming.

Cursors 222 and 224 are used to navigate to earlier or later time periods, respectively. Web browser cursors 226 and 228 allow the user to scroll through the program listings. The user may also navigate the program listings with time navigation buttons 230. For example, if the user would like to view program listings that begin in the morning, the user clicks on the morning navigation button 230. If the user would like to view program listings for programs currently being broadcast, the user may click on the current navigation button 230. Program listings for different days in the month may be viewed by selecting the appropriate day from calendar buttons 232.

The user can chose between various available view options by selecting the appropriate time, channel, category, or search button from among view buttons 234. View buttons 234 take the user to the same web pages that are presented when the corresponding options 202 of FIG. 15 are selected. For example, by channel option 212 and channel view button 234 are both linked to by channel page 242 (FIG. 17).

Figure 30:
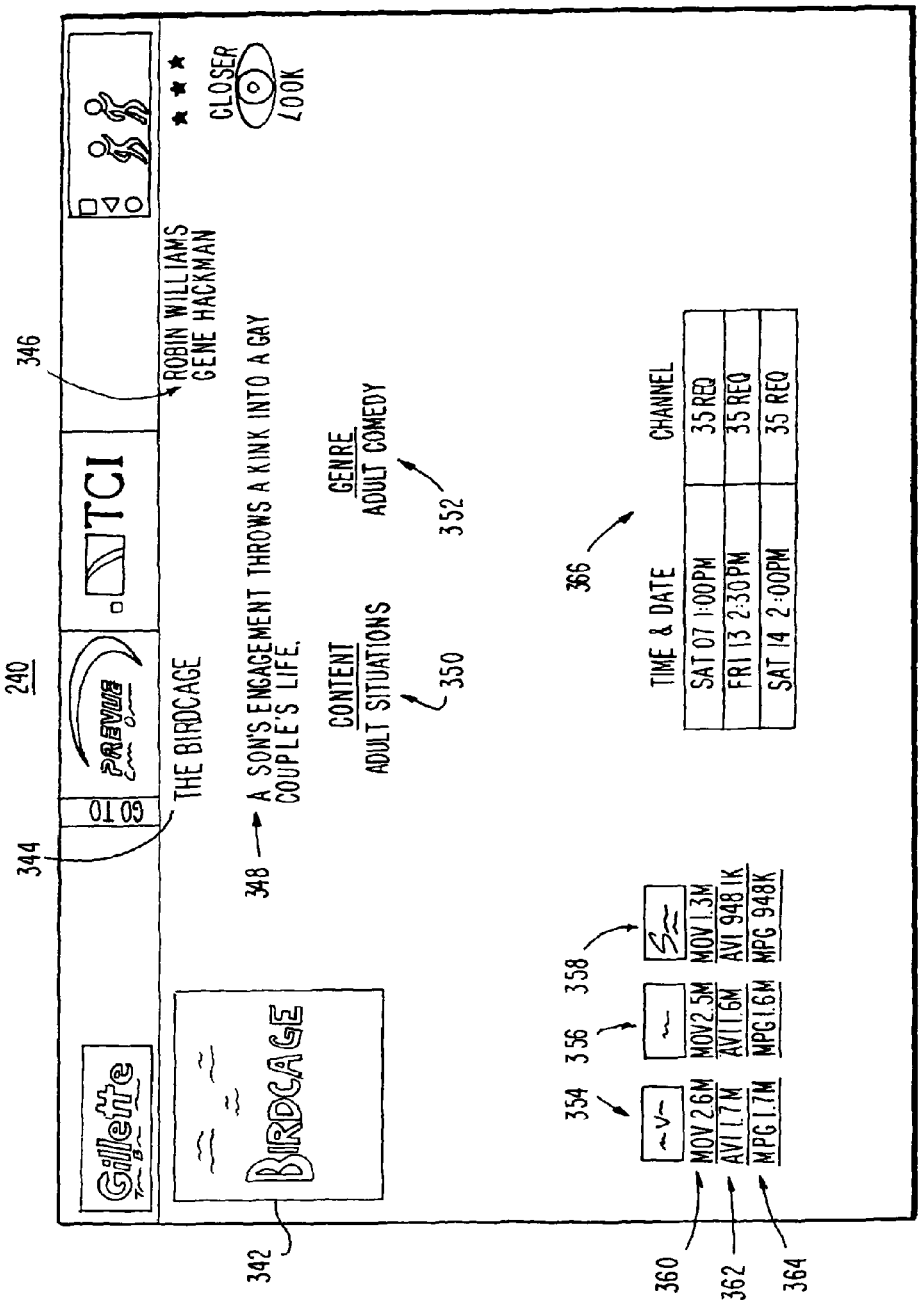
FIG. 30 is a program information web page containing information on a program selected by the user and presenting related options.

Another component of by time page 218 and various other web pages provided by the present system is program information box 236. The contents of program information box 236 changes dynamically, depending on which program title in program listings 220 is selected. For example, the user has clicked on the entry "Primal Fear" in program listings 220 of FIG. 16. As a result, the contents of program information box 236 reflect this selection. Program information box 236 typically contains the program title (e.g., Primal Fear), the running time of the program (e.g., 2:09), a brief description of the program (e.g., A hot shot . . . ), and a description of the program type or genre (e.g., drama movie). The program description may contain information on the actors in the program, the director, etc. Program information box 236 typically provides a rating of the program, such as a star rating (e.g., three stars) or the Motion Picture Association of America (MPAA) rating for movies or the television rating for television programs. If the user desires to view additional information relating to the selected program, the user may click on closer look icon 238 (or alternatively, on any portion of box 236), which takes the user to program information page 240 (FIG. 30).

If desired, when programs are selected by a user that are currently being broadcast, direct tune button 231 may be displayed. When direct tune button 231 is clicked on by the user, processing unit 60 directs video unit 64 to select the appropriate television signal from television signal input 74 to display the selected program on monitor 72.

Figure 17:
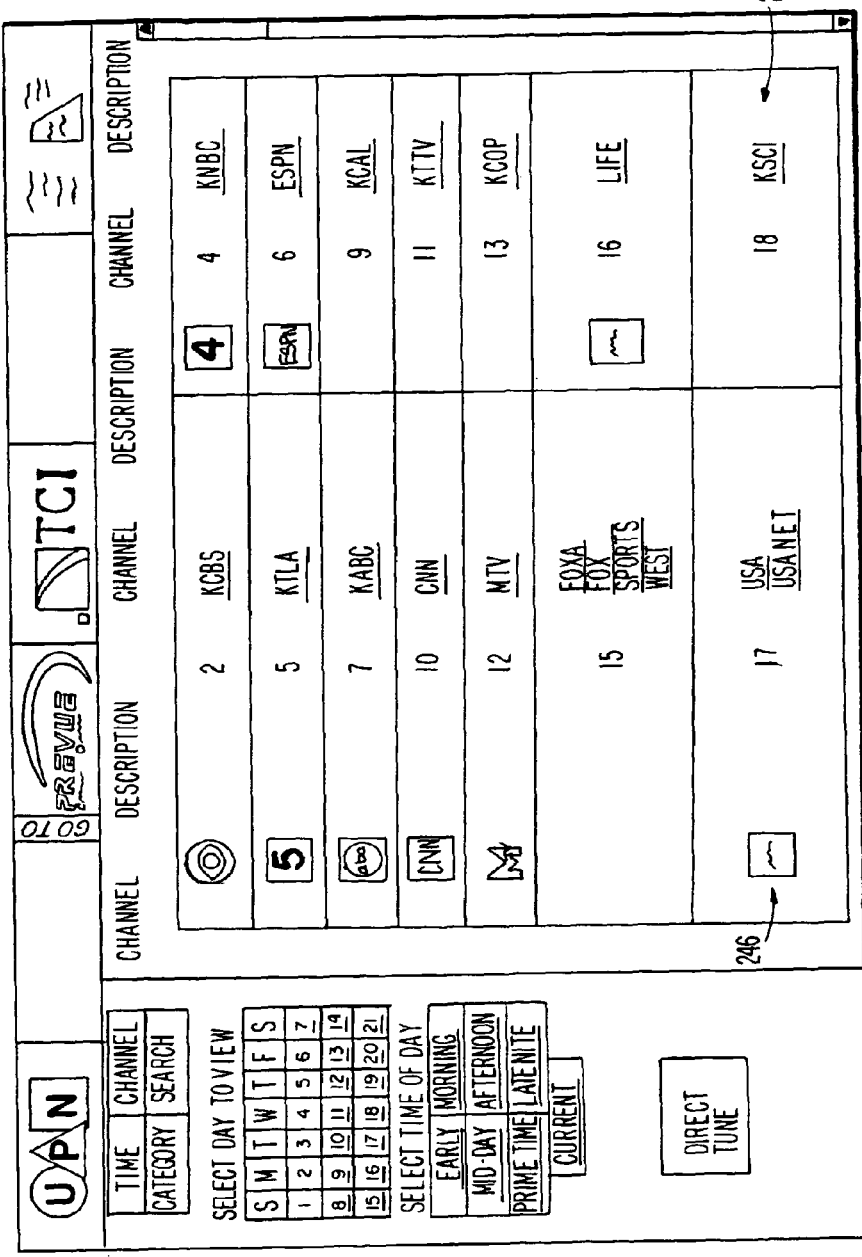
FIG. 17 is a web page presenting a menu of channel selections.

By channel page 242 of FIG. 17 is presented when the user selects by channel option 212 from program guide menu page 194 (FIG. 15) or when the user clicks on a channel view button, such as channel view button 234 of by time page 218 (FIG. 16). By channel page 242 contains channel list 244. Channel list 244 may be arranged in channel number order and may contain associated icons 246 for certain channels. A user can click on each individual channel 248 in channel list 244 to obtain a list of program information based on the selected channel. A user can also click on a graphic or text link to a listed network's web site to be hyperlinked to that site.

When a channel 248 is selected, the user is presented with channel program list page 250, as shown in FIG. 18. The selected channel in the example of FIG. 18 is channel 2. In channel program list page 250, program listings 252 for the selected channel may be arranged in time order, beginning with the current time. If programs in program listings 252 extend into the next day, the programs may be separated by date separation bar 254. Title bar 256 contains information identifying the currently selected channel.

Figure 19:
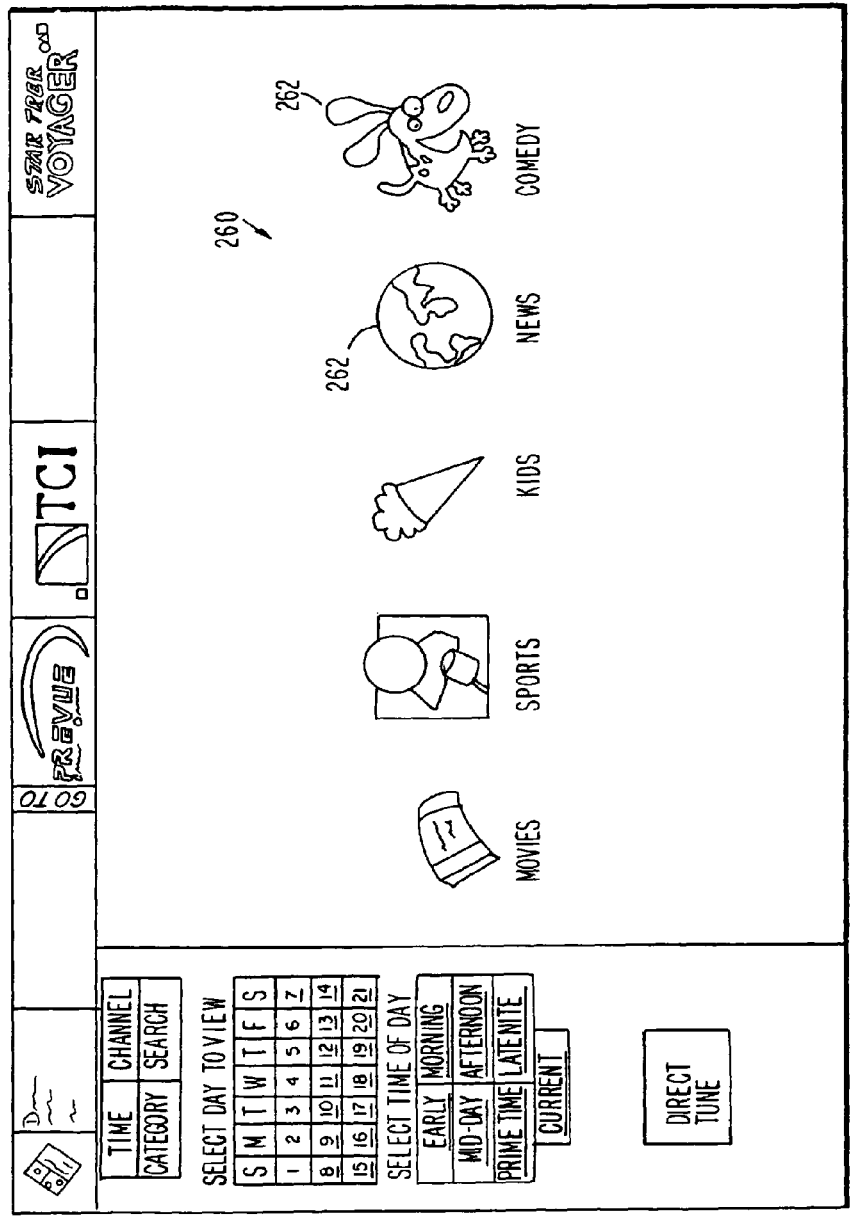
FIG. 19 is a web page containing icons representing category options.

By category page 258 of FIG. 19 is presented when the user selects by category option 214 from program guide menu page 194 (FIG. 15) or when the user clicks on a category view button, such as category view button 234 of by time page 218 (FIG. 16). By category page 258 contains category list 260, which may be presented in the form of category icons 262. A user can click an individual category icon 262 in category list 260 to obtain a list of program information based on the selected category.

When a category is selected, the user is presented with category program list page 264, as shown in FIG. 20. In category program list page 264, program listings 266 may be arranged in time and channel order, beginning with the current time and date. Program listings 266 contain the channel information for each program adjacent to the program title. If a user wishes to view program information for a given channel, the user may click on one of the displayed channels. The user is then presented with a program list that is restricted to programs appearing on the selected channel.

If desired, the program list that is displayed in category program list page 264 may be limited to programs appearing in the next 24 hour period. The user may view information for later days by clicking on the appropriate day in calendar buttons 270.

Search page 272 of FIG. 21 is presented when the user selects search option 216 from program guide menu page 194 (FIG. 15) or when the user clicks on a search view button, such as search view button 234 in by time page 218 (FIG. 16). Search field options 274 allow the user to select a search field, such as title, actor, category, description, rating. A search text string is entered in search text box 276.

After search text has been entered in search text box 276 and one of search field options 274 has been selected, the requested search is performed (e.g., by web server 20 (FIG. 1) or web server 86 (FIG. 3)) and the user is provided with search results page 278 of FIG. 22. Search results page 278 contains program listings 280 that satisfy the search criteria specified using search page 272 (FIG. 21). For example, the program listings 280 in FIG. 22 resulted from a search for the text string "Gibson" in the actor search field, as shown by search criteria bar 282.

The user may reach movie guide menu page 196 (FIG. 23) from go national option 138 (FIGS. 4 and 8) or go satellite option 140 (FIGS. 4 and 8). If the user selects go local option 136 (FIG. 4) and successfully completes registration page 162 (FIG. 9), the user may reach movie guide menu page 196 (FIG. 23) by selecting movie guide option 192 on local cable site page 170 (FIG. 10). Each of these paths to movie guide menu page 196 requires that slightly different user selections be made.

Go local option 136 (FIG. 4) requires that a user specify a particular local region (or cable system operator) of interest to reach local cable site page 170 (FIG. 10). To reach movie guide menu page 196 (FIG. 23) from local cable site page 170, the user selects movie guide option 192.

Go national option 138 (FIGS. 4 and 8) requires that a user select a desired time zone (e.g., eastern, central, mountain, or pacific). To reach movie guide menu page 196 from welcome page 124 (FIG. 4) or pick again page 152 (FIG. 8), the user selects movie guide option 290.

Go satellite option 140 (FIGS. 4 and 8) requires that the user select a desired satellite provider 286. To reach movie guide menu page 196 from welcome page 124 (FIG, 4) or pick again page 152 (FIG. 8), the user selects movie guide option 292.

Regardless of which option is used to reach movie guide menu page 196, information is preferably retained by the system 10 or 78 that indicates which selections have been made by the user. Retaining this information allows subsequently displayed program listings and other information to be automatically customized to reflect the user's selections.

As shown in FIG. 23, movie guide menu page 196 contains hot picks option 294, movie cruiser option 296, main event option 298, and interview option 300. When the user selects one of these options by clicking on the associated icon, the user is presented with a corresponding web page for that feature.

If the user selects hot picks option 294, the user is provided with hot picks page 302, as shown in FIG. 24. Hot picks page 302 contains images 304, 306, 308, and 310 of popular programs for which promotional materials are available. Images 304 and 308 typically contain program titles. Images 306 and 310 typically contain actor stills. The programs for which images 304, 306, 308, and 310 are displayed may be automatically selected in accordance with their upcoming frequency on the pay-per-view services. The upcoming frequency may be calculated based on the number of expected occurrences of a given program in a predetermined period of time (e.g., seven days). The predetermined period may be commenced starting with the current date and time, thereby allowing for a seamless crossing of the monthly barrier. The information used to determine which program images are displayed is preferably customized based on the selections (local, national, satellite, etc.) previously made by the user.

When the user clicks on one of images 304, 306, 308, or 310, the user is taken to program information page 240 (FIG. 30), which allows the user to obtain additional information, such as video clips and interview segments on the selected program. When a user clicks on pay-per-view link 312 or pay-per-view link 314, the user is taken to pay-per view page 316 (FIG. 26), which provides the user with pay-per-view program listings for the selected program.

Figure 25:
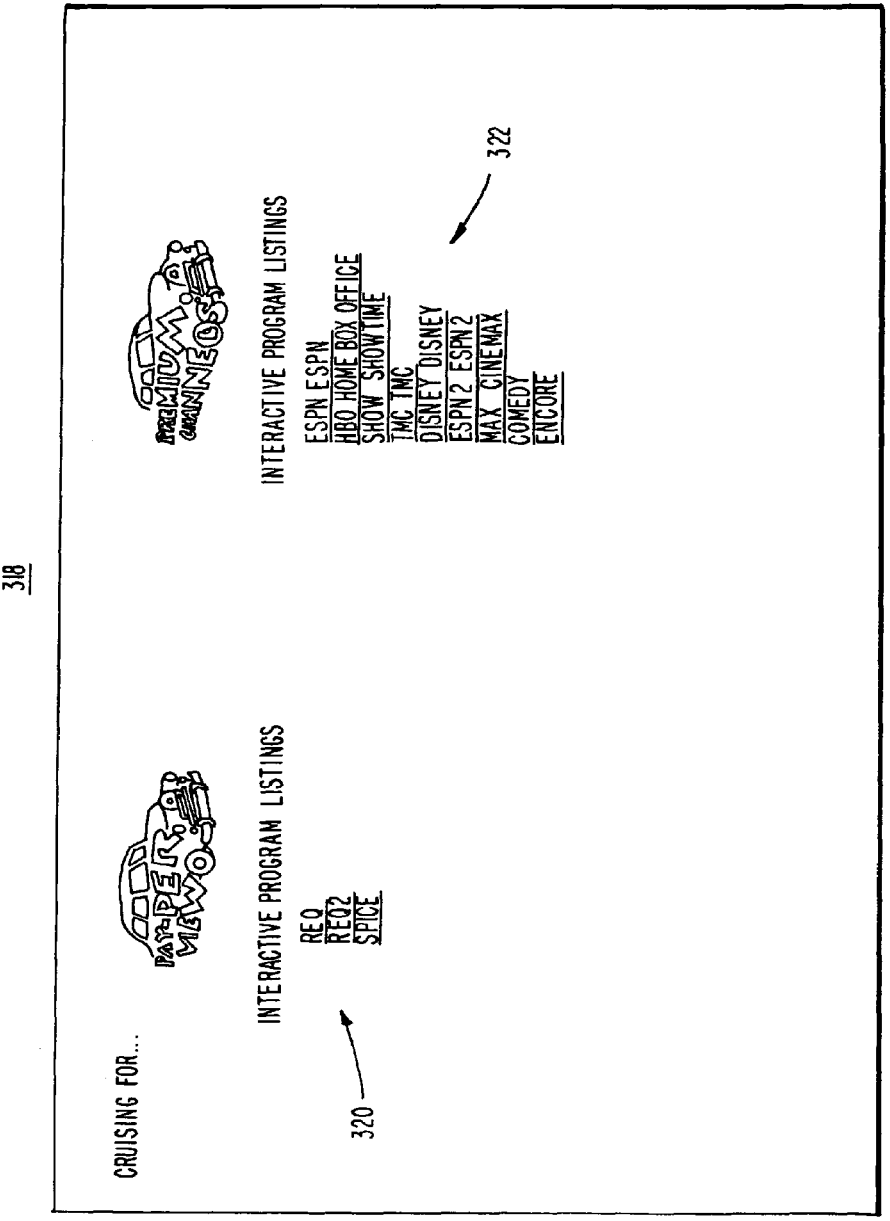
FIG. 25 is a web page presenting user options regarding pay-per-view and premium services.

When the user selects movie cruiser option 296, the user is presented with movie cruiser page 318, as shown in FIG. 25. Movie cruiser page 318 lists the pay-per-view and premium channels that are available to the user (based on previous selections). In particular, movie cruiser page 318 contains pay-per-view channel options 320 and premium channel options 322.

If the user selects one of pay-per-view options 320, the user is taken to pay-per-view page 316, as shown in FIG. 26. Pay-per-view page 316 contains program listings 324 for pay-per-view events. Multiple pay-per-view programs may be simultaneously listed in a grid format or may be listed as shown in FIG. 26 for a selected pay-per-view channel (i.e., channel 35). As with several other pages, page 316 contains program information box 325, which contains program information when a program from program listings 324 has been selected by the user. Clicking on box 325 (or a closer look icon in box 325) takes the user to program information page 240 (FIG. 30).

If the user selects one of premium channel options 322 on page 318 (FIG. 25), the user is taken to premium services page 326, as shown in FIG. 27. Premium services page 326 contains program listings 328 for premium events. Multiple premium service programs may be simultaneously listed in a grid format or a single program may be listed as shown in FIG. 27 for a selected premium service (i.e., the Disney® channel). Program information box 330 provides program information for a program that has been selected by the user. In the example of FIG. 27, the user has clicked on "Pete's Dragon." Clicking on program information box 330 (or a closer look icon in box 330) takes the user to program information page 240 (FIG. 30), where the user can view additional information on the selected program (i.e., information on the movie Pete's Dragon).

Figure 31:
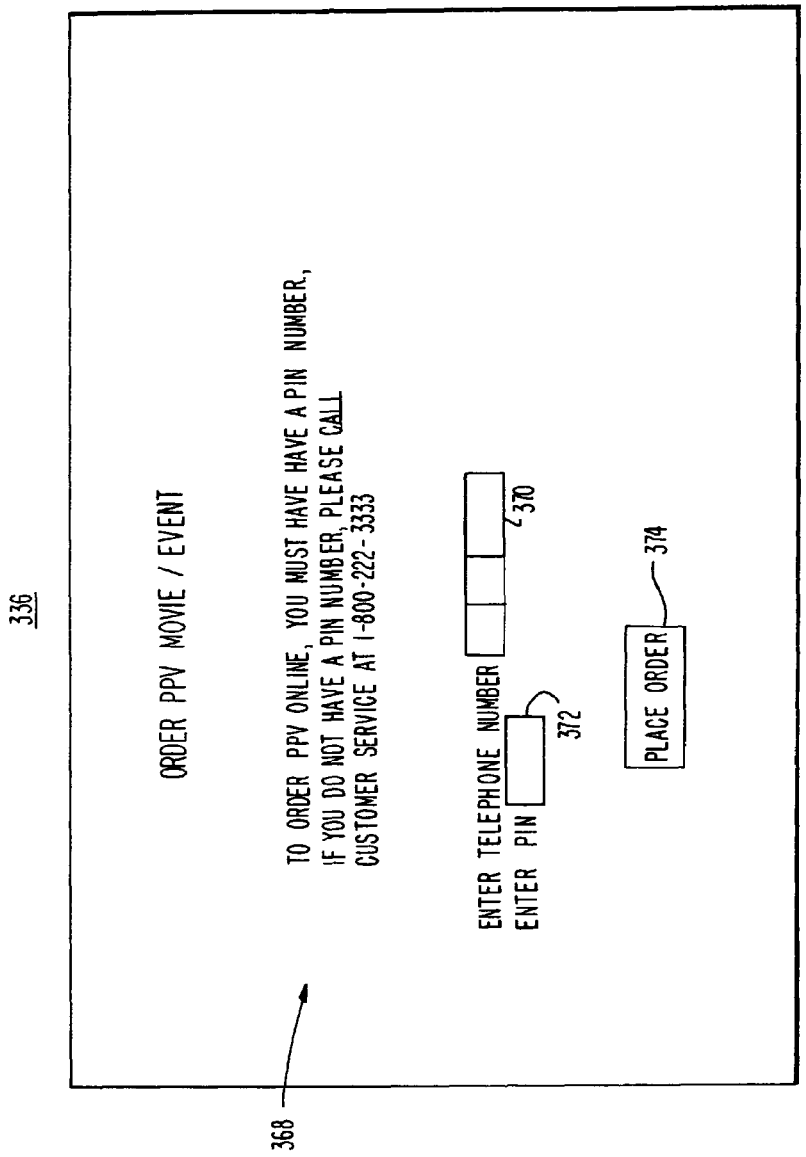
FIG. 31 is a web page that allows a user to enter information for ordering a pay-per-view event.

When the user selects main event option 298 from movie guide menu page 196. (FIG. 23), the user is presented with main event page 332, as shown in FIG. 28. Main event page 332 lists premium or pay-per-view sports events and other special events. By clicking on an event (e.g., event 334), the user may be presented with an associated program information page (such as page 240 of FIG. 30), provided that additional information on the event is available. Alternatively, the user may be directly presented with pay-per-view order page 336 (FIG. 31).

Figure 29:
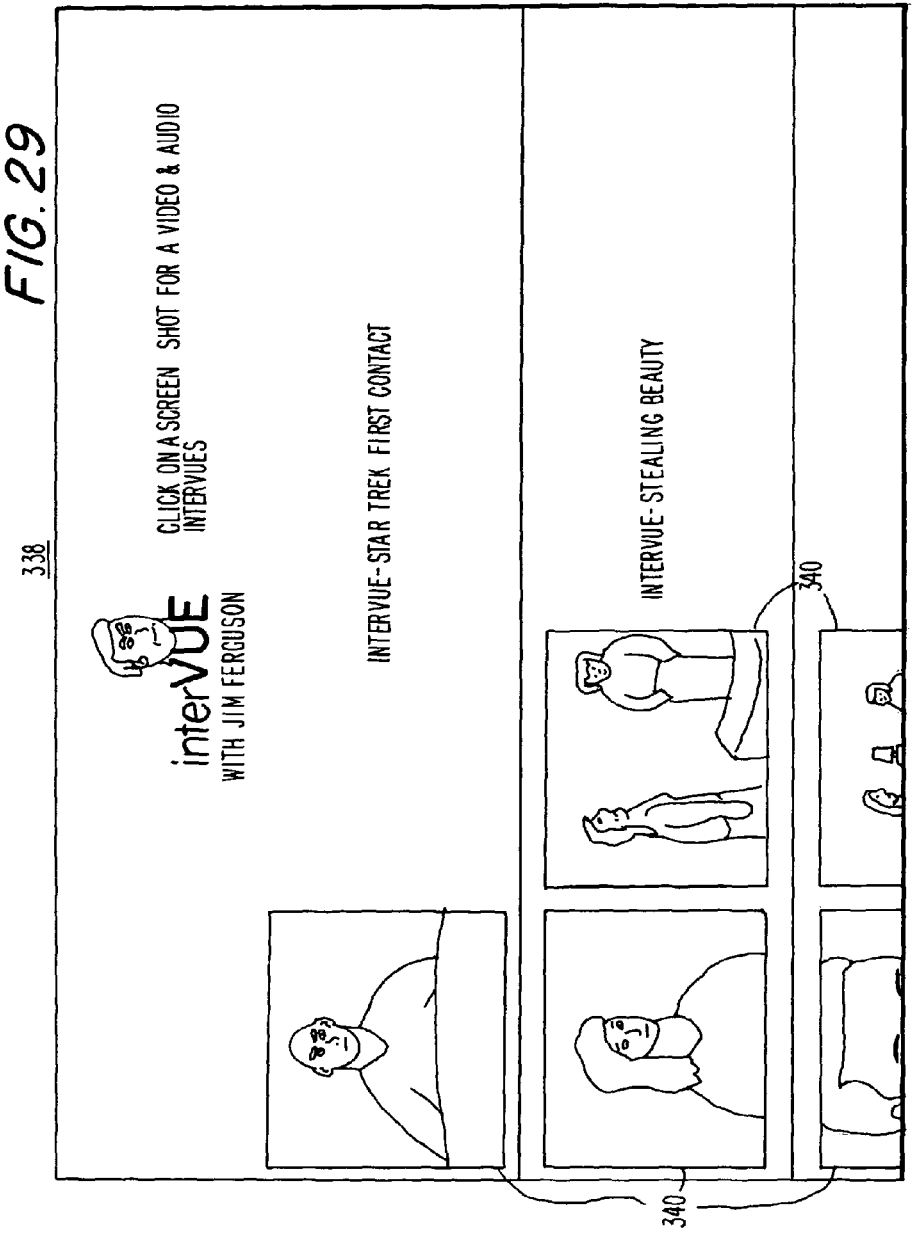
FIG. 29 is a web page containing still images corresponding to available interview segments.

When the user selects interview option 300 from movie guide menu page 196 (FIG. 23), the user is presented with interview page 338, as shown in FIG. 29. Interview page 338 contains still images 340 of various subjects. As with other pages in the Internet program guide service, the subjects presented on interview page 338 are customized to reflect the user's selected type of service (e.g., the user's selection of a particular cable system operator or the user's selection of national service or a particular satellite service). Accordingly, images 340 relate to interviews for the movies and other programs currently available to the user. The determination of which interview images 340 are to be made available on interview page 338 may be based on a calculation of the most frequently scheduled upcoming programs in a predetermined time period (e.g., in the upcoming week). If desired, interviews corresponding to programs hot currently available to the user may also be provided. The user may select a given interview by clicking on one of images 340. The user is then taken to program information page 240 (FIG. 30).

As shown in FIG. 30, program information page 240 contains detailed information on a selected program (e.g., the movie Birdcage). Program information page 240 preferably contains image 342, which may initially be presented as a still image of the program title (e.g., from a JPEG or GIF file). When a user clicks on image 342, an associated video clip is presented. Program information page 240 also contains title 344, actor information 346, and program description 348. Additional information may include content information 350 and genre information 352. If desired, information may be provided on the director, year of release, and other relevant items. Additional actor information may be supplied (e.g., in the form of biographical information and related video clips accessed by clicking on actors 346).

Interview icon 354, commentary icon 356, and promotional clip icon 358 represent available services. The user can view video clips of interviews on the selected program (i.e., the movie Birdcage) by clicking on the appropriate file-type option associated with a given service. For example, file options 360, 362, and 364 are associated with an interview service (represented by interview icon 354). Clicking on file option 360 allows the user to view interview video clips using a protocol appropriate for an MOV file (e.g., using the Quick-Time application). Clicking on file option 362 or 364 allows the user to view interview video clip using a protocol appropriate for an AVI or MPG (MPEG) file (e.g., using the Active-Movie application). Commentary icon 356 and promotional clip icon 358 have associated file options (e.g., MOV, AVI, and MPG options) that allow the user to view commentary or promotional video clips for the selected program.

Program information page 240 contains information tied to the program selected by the user on previous pages. The user may reach program information page 240 by various paths. For example, the user may select a program from program listings 220 in by time page 218 (FIG. 16) by clicking on the desired program title. The user may also select a pay-per-view or premium program from pay-per-view page 316 (FIG. 26) or premium services page 326 (FIG. 27) by clicking on the appropriate listing. When the user reaches program information page 240, program information is provided for the selected program. Icons and other indicators are used to identify which services are available for the selected program. For example, if no commentary video clips are available for a given program, then the file options below commentary icon 356 may be omitted. Similarly, if no video still is available for a movie, image 342 can be omitted.

Program information page 240 contains program listings 366, which provide program title, channel, and time and date information for the selected program. In the example shown in FIG. 30, the movie Birdcage is appearing on channel 35 (a pay-per-view channel) on three days in the next weekly period. When the user clicks on a pay-per-view entry in program listings 366, the user is taken to order page 336 (FIG. 31).

As shown in FIG. 31, order page 336 contains instructions 368 on how to order a pay-per-view event. Order page 336 also contains telephone number query box 370 and personal identification number box 372. The user may place an order for a pay-per-view event by clicking on place order button 374. Information entered by the user into boxes 370 and 372 is used to verify the user's identity and account status. Once the user's information has been verified, the selected pay-per-view event may be delivered to the user's multimedia system.

The way in which pay-per-view event orders are processed depends on the particular hardware used to deliver services to the user. Order and account verification information is generally electronically submitted to the headend cable system operator or a third party order fulfillment processor linked to the headend system. Equipment in the headend processes the order automatically and arranges for the delivery, of the pay-per-view event to the user. Typically, the headend equipment directs equipment (such as a set-top box or similar integrated component) in the user's multimedia system to display the ordered event.

In system 78 of FIG. 3, web server 86 at cable system headend 88 may be used to receive and process pay-per-view orders submitted using order page 336. After processing the order, web server 86 can direct conventional pay-per-view equipment at headend 88 to authorize the display of the ordered pay-per-view event using set-top box 116.

Similar techniques for delivering pay-per-view events may be used with other hardware arrangements such as those shown in FIGS. 1-3. If desired, after web server 86 has processed the user's pay-per-view order, web server 86 can communicate authorization information to processing unit 60 (FIG. 2) in the user's multimedia system 58 (FIG. 2). Processing unit 60 (FIG. 2) can direct video unit 64 (FIG. 2) to decode and display the pay-per view event from among the received television signals 74 (FIG. 2) based on the authorization information.

Order page 336 can be provided with user-selectable options for recording programs and for reminding the user when selected programs are about to be broadcast. For example, order page 336 may contain a clickable record button. Selecting the record option by clicking on the record button directs multimedia system 58 (FIG. 2) to record the selected program (by controlling recording unit 68 of video unit 64 with processing unit 60) when the selected program is being aired. Similarly, order page 336 may contain a clickable reminder button. Selecting the reminder option by clicking on this button directs multimedia system 58 to remind the user of the upcoming selected program (e.g., 10 minutes before the scheduled broadcast time) by automatically tuning to the desired channel, by displaying a reminder message, or by issuing an audible reminder. Reminder messages may also be generated by web server 20 or 86 and transmitted to multimedia system 58 by e-mail.

If desired, these selectable recording and reminder features can be incorporated into other pages, such as program information page 240, one of the pages containing television program listings, or a page presented to the user after clicking on place order button 374.

Figure 32:
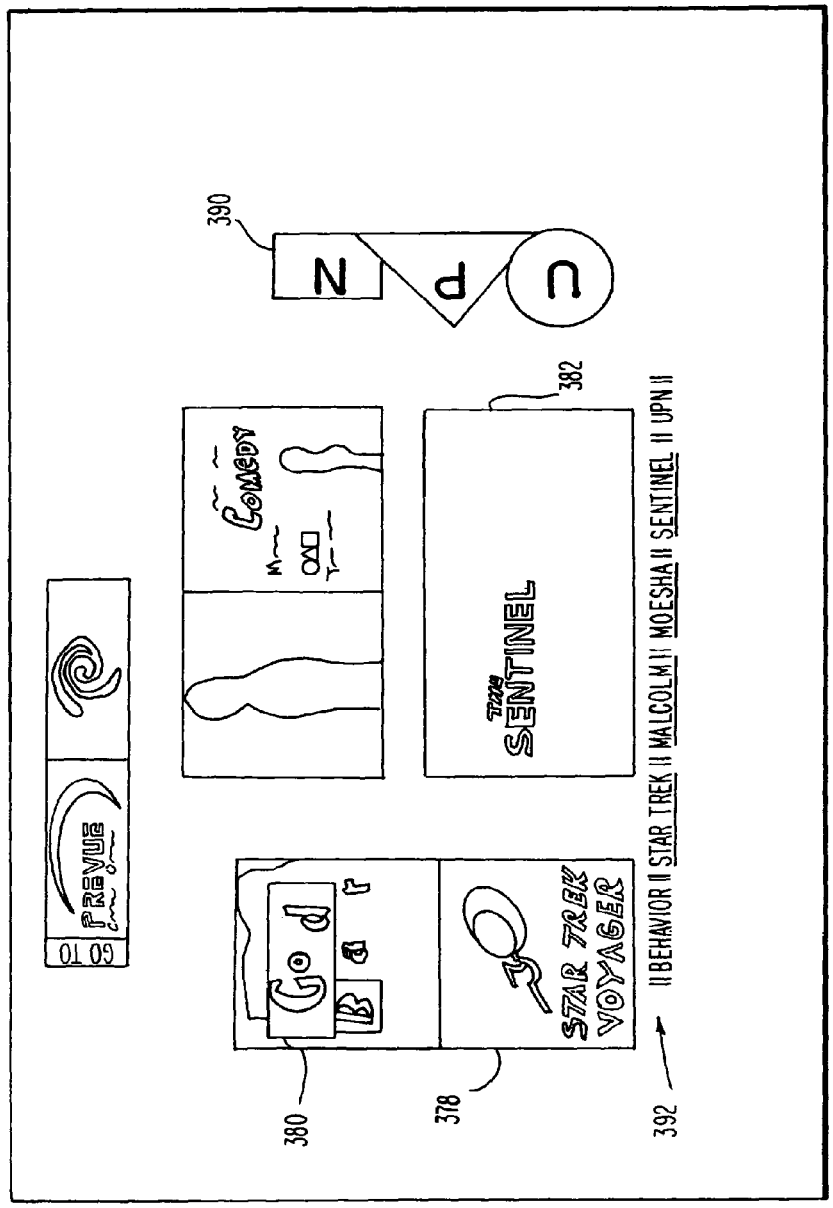
FIG. 32 is a web page that provides a showcase for advertisers.

When a user clicks on an advertisement (typically an image) in one of the web pages associated with the program guide service, the user may be taken directly to a more detailed advertisement page. Alternatively, the user may be taken to advertiser showcase page 376, as shown in FIG. 32. Advertiser showcase page 376 contains clickable images, such as images 378, 380, and 382, which are linked to more detailed advertising pages. Advertiser showcase page 376 also may contain a advertiser logo image, such as image 390. Text bar 392 contains clickable text fields that duplicate the selections available by clicking on images.

The advertiser logo image in advertiser showcase page 376 may be linked to the web site of the advertiser. For example, image 390 may be linked to a web site for UPN, so that if the user clicks on image 390, the user will be taken to the UPN web site.

If the user clicks on an image such as images 378, 380, or 382 in advertiser showcase page 376, the user is presented with advertisement page 394, as shown in FIG. 33. Advertisement page 394 contains detailed information related to the subject matter of the image that was selected from advertiser showcase page 376 (FIG. 32). In the example of FIG. 33, additional information is provided on the program "The Sentinel," because this program was selected in advertising showcase page 376 by clicking on image 382. If desired, advertisement page 394 can contain appropriate links to further advertisement pages or to the advertiser's home page.

FIG. 34 is a site map of the television program guide service. The service can be accessed from service provider home page 396. Selecting the television program guide service from home page 396 takes the user to welcome page 124. If the user selects the go local option and no service is available, no service page 150 and pick again page 152 are presented. If the user selects the go local option and service is available, the user is taken to registration page 162. If maps 146 (FIG. 5) and 148 (FIG. 6) are used to define the local area of interest, the maps may be provided in path 398 between welcome page 124 and registration page 162.

Selecting an advertisement by clicking on its image may typically be done on any page containing an advertisement. In the example of FIG. 34, selecting an advertisement on registration page 162 takes the user to advertiser showcase page 376. Selecting an image on advertiser showcase page 376 takes the user to advertisement page 394.

Completing the registration form on registration page 162 allows the user to proceed to local cable site page 170. From local cable site page 170, the user can view community events page 178 by selecting the community events option. By selecting the cable feedback option, the cable operator option, or the local weather option, the user can access cable feedback page 182, cable operator page 186, or local weather page 188.

If the user selects the go national option on welcome page 124, the user is taken to program guide menu page 194 or movie guide menu page 196, depending on whether the user selected the program guide or movie guide option. Similarly, if the user selects the go satellite option on welcome page 124, the user is taken to program guide menu page 194 or movie guide menu page 196, depending on whether the user selected the program guide or movie guide option. The user can also reach program guide menu page 194 or movie guide menu page 196 from pick again page 152 or local cable site page 170. If the user reaches program guide menu page 194 from either pick again page 152 or local cable site page 170, the local area of interest to the user is retained by the system, so that subsequently displayed program guide listings can be customized to the user's local area.

When the user is at program guide menu page 194, selecting the program guide channel option tunes the system directly to program guide television channel 400. Similarly, selecting the movie guide channel option tunes the system to movie guide television channel 402. Selecting the time option from program guide menu page 194 takes the user to by time page 218. If a program is selected that is currently being broadcast and is therefore available for the user to view, a direct tune option may be displayed on by time page 218 or any page containing program listings. Selecting the direct tune option tunes the user's television unit directly to selected television channel 404.

Selecting the channel option from program guide menu page 194 takes the user to by channel page 242. When the user selects a desired channel, channel program list page 250 is displayed. Selecting the category option from program guide menu page 194 takes the user to by category page 258. When the user selects a desired category, category program list page 264 is displayed.

When the user at program guide menu page 194 selects the search option, search page 272 is presented. Search page 272 allows the user to enter search terms and to initiate a search of a program database. After the search is performed, search results page 278 is displayed.

Selecting the movie guide option from welcome page 124, pick again page 152, or local cable site page 170 presents the user with movie guide menu page 196. If the user selects the interview option, the user is presented with interview page 338. When the user selects an interview from interview page 338, the user is taken to program information page 240 to view the interview. If the user selects the hot picks option from movie guide menu page 196, the user is presented with hot picks page 302. When the user selects a hot pick from the displayed images on hot picks page 302, the user is taken to program information page 240 to view a promotional video clip for the hot pick. If the user selects the main event option from movie guide menu page 196, the user is presented with main event page 332. When the user selects a given event from main events page 332, the user is taken to program information page 240 to view information on that event. Alternatively, the user may be taken to order page 316 to place an order for the event.

Selecting the movie cruiser option from movie guide menu page 196 presents the user with movie cruiser page 318. The user can view pay-per-view page 316 by selecting the pay-per-view option. The user can view premium services page 326 by selecting the premium option. Programs may be selected by the user from either pay-per-view page 316 or premium services page 326. In either case, the user is taken to program information page 240 to view additional information on the selected program.

Program information page 240 allows the user to view multimedia material on a given program, interview, event, etc. The content of program information page 240 depends on the path taken to reach program information page 240 and the options selected by the user. Program information page 240 contains options that allow the user to select a program to view. When the user makes such a program selection, the user is presented with order page 336.

The foregoing is merely illustrative of the principles of this invention and various modifications can be made by those skilled in the art without departing from the scope arid spirit of the invention.

What is claimed is:

1. A method for transmitting at least one reminder message for at least one media asset to a user of a multimedia system, the method comprising:
   receiving, from a first user device that is capable of generating a display including the at least one media asset, user input to set the at least one reminder message for the at least one media asset, wherein the at least one reminder message is primarily associated with the user, wherein the at least one reminder message does not comprise an email communication, and wherein the at least one reminder message is designated to be delivered to a second user device different from the first user device on which the at least one reminder message was set;
   prior to a transmission time of the at least one media asset, automatically generating the at least one reminder message for the at least one media asset; and
   automatically transmitting the at least one reminder message to the second user device over a communications link to remind the user when the at least one media asset is to be transmitted such that the second user device receives the at least one reminder message without transmitting a request to receive the at least one reminder message, wherein the second user device different from the first user device is capable of generating the display including the at least one media asset.

2. The method of claim 1 wherein automatically generating the at least one reminder message comprises automatically generating the at least one reminder message using a server.

3. The method of claim 2 wherein the server is a web server.

4. The method of claim 1, wherein the communications link is at least one of an Internet communications link that utilizes Internet Protocol data transmissions, a wireless communications link, and a telephone communications link.

5. The method of claim 1, wherein receiving the user input to set the at least one reminder message comprises receiving the user input to set the at least one reminder message using the multimedia system.

6. The method of claim 1 further comprising:
   generating a display including a plurality of media asset identifiers; and
   receiving a selection of at least one media asset identifier, wherein the receipt of the selection causes the at least one reminder message to be set for the selected at least one media asset identifier.

7. The method of claim 1, wherein the at least one media asset is video content.

8. The method of claim 1, further comprising generating a customization web page for display, wherein the customization web page contains a plurality of selectable options for customizing how the at least one reminder message is to be received by the user.

9. The method of claim 8, wherein a selectable option of the plurality of selectable options is a pop-up reminder option.

10. The method of claim 9, wherein a pop-up reminder is generated for display to the user at a time prior to the transmission time of the at least one media asset if the pop-up reminder option is selected.

11. The method of claim 1, wherein the communications link is an Internet communications link that utilizes Internet Protocol data transmissions.

12. The method of claim 1, wherein the transmission time is a broadcast time of the media asset.

13. The method of claim 1, further comprising generating for display a display screen at the first user device, wherein the display screen includes a first selectable option for ordering the at least one media asset, and wherein the display screen includes a second selectable option for setting a reminder for the at least one media asset.

14. The method of claim 13, wherein the display screen is a web page.

15. A system for transmitting at least one reminder message for at least one media asset to a user of a multimedia system, the system comprising a server configured to:
   receive, from a first user device that is capable of generating a display including the at least one media asset, user input to set the at least one reminder message for the at least one media asset, wherein the at least one reminder message is primarily associated with the user, wherein the at least one reminder message does not comprise an email communication, and wherein the at least one reminder message is designated to be delivered to a second user device different from the first user device on which the at least one reminder message was set;
   prior to a transmission time of the at least one media asset, automatically generate at least one reminder message for the at least one media asset; and
   automatically transmit the at least one reminder message to the second user device over a communications link to remind the user when the at least one media asset is to be transmitted such that the second user device receives the at least one reminder message without transmitting a request to receive the at least one reminder message, wherein the second user device different from the first user device is capable of generating the display including the at least one media asset.

16. The system of claim 15 wherein the multimedia system includes a processing unit.

17. The system of claim 15 wherein the server is a web server.

18. The system of claim 15, wherein the communications link is at least one of an Internet communications link that utilizes Internet Protocol data transmissions, a wireless communications link, and a telephone communications link.

19. The system of claim 15 wherein the server is further configured to:
   generate a display including a plurality of media asset identifiers; and
   receive selection of at least one media asset identifier, wherein the receipt of the selection causes the at least one reminder message to be set for the selected at least one media asset identifier.

20. The system of claim 15, wherein the at least one media asset is video content.

21. The system of claim 15, wherein the processor is further configured to generate a customization web page for display, wherein the customization web page contains a plurality of selectable options for customizing how the at least one reminder message is to be received by the user.

22. The system of claim 21, wherein a selectable option of the plurality of selectable options is a pop-up reminder option.

23. The system of claim 21, wherein a pop-up reminder is generated for display to the user at a time prior to the transmission time of the at least one media asset if the pop-up reminder option is selected.

24. The system of claim 15, wherein the communications link is an Internet communications link that utilizes Internet Protocol data transmissions.

25. The system of claim 15, wherein the transmission time is a broadcast time of the media asset.

26. The system of claim 15, wherein the processor is further configured to generate for display a display screen at the first user device, wherein the display screen includes a first selectable option for ordering the at least one media asset, and wherein the display screen includes a second selectable option for setting a reminder for the at least one media asset.

27. The system of claim 26, wherein the display screen is a web page.

28. A system for transmitting a reminder message for video content of a program to a viewer, the system comprising a server configured to:
receive user input at a first user device to set a reminder message for the video content of the program over a data network from an address, wherein the first user device is capable of generating a display including the video content of the program, wherein the reminder message is designated to be delivered to a second user device different from the first user device on which the at least one reminder message was set, and wherein the reminder message does not comprise an email communication;
prior to a transmission time of the video content of the program, automatically generate the reminder message for the video content of the program; and
automatically transmit the reminder message to the second user device to remind the viewer that the video content of the program is to be transmitted such that the second user device receives the reminder message without transmitting a request to receive the reminder message, wherein the second user device different from the first user device is capable of generating the display including the video content of the program.

29. The system of claim 28 wherein the reminder message is transmitted to the second user device over a network other than the data network.

30. The system of claim 28 wherein the server is configured to generate a display for the viewer with a page including a plurality of media asset identifiers from which the viewer can set up the reminder message.

31. The system of claim 28, wherein the transmission time is a broadcast time of the video content of the program.

32. The system of claim 28, wherein the processor is further configured to generate, at the server, for display a display screen at the first user device, wherein the display screen includes a first selectable option for ordering the video content of the program, and wherein the display screen includes a second selectable option for setting a reminder for the video content of the program.

33. The system of claim 32, wherein the display screen is a web page.

* * * * *